United States Patent [19]

Hara et al.

[11] Patent Number: 5,375,427
[45] Date of Patent: Dec. 27, 1994

[54] AIR CONDITIONER FOR VEHICLE

[75] Inventors: Junichiro Hara, Yokohama; Takayoshi Matsuoka, Yokosuka, both of Japan

[73] Assignee: Nissan Motor Co., Ltd., Yokohama, Japan

[21] Appl. No.: 185,419

[22] Filed: Jan. 24, 1994

[30] Foreign Application Priority Data

Jan. 29, 1993 [JP] Japan .................. 5-013898

[51] Int. Cl.5 ............................ F25B 13/00
[52] U.S. Cl. ....................... 62/159; 62/90; 62/324.6
[58] Field of Search ............. 165/43; 62/117, 173, 62/196.4, 90, 176.5, 160, 324.6

[56] References Cited

U.S. PATENT DOCUMENTS

| 3,798,920 | 3/1974 | Morgan | 62/173 |
| 5,277,034 | 1/1994 | Hodo et al. | 62/160 |
| 5,299,431 | 4/1994 | Iritani et al. | 62/90 X |

FOREIGN PATENT DOCUMENTS

| 2-130808 | 10/1990 | Japan. | |
| 2-290475 | 11/1990 | Japan. | |
| 2258302 | 2/1993 | United Kingdom | 62/90 |

*Primary Examiner*—William E. Wayner
*Attorney, Agent, or Firm*—Foley & Lardner

[57] ABSTRACT

An air conditioner for a vehicle having a compressor, an outer heat exchanger, a heat-radiating inner heat exchanger an expansion valve, a heat-absorbing inner heat exchanger which are connected thereamong. A connecting condition of these elements is changed into one of a cooling, a heating and a weak heating, by controlling a refrigerant passage switching device. During the cooling, refrigerant in the air conditioner is circulated in the order of at least the outer heat exchanger, the expansion valve, the heat-absorbing inner heat exchanger and the compressor. During the heating the refrigerant is circulated in the order of the heat-radiating inner heat exchanger, the expansion valve, the heat-absorbing inner heat exchanger and the compressor while bypassing the outer heat exchanger. During the weak heating, the refrigerant is circulated in the order of the heat-radiating inner heat exchanger, the expansion valve, at least the outer heat exchanger and the compressor. Therefore, it becomes possible to implement a heating operation in a wide-range from an intensely cold condition to a slightly cool condition while saving an energy consumption.

16 Claims, 22 Drawing Sheets

FIG.5

| MODE | FOUR-WAY VALVE | | REFRIGERANT FLOW SWITCHING VALVE | | | HEAT-RADIATING INNER HEAT EXCHANGER | HEAT-ABSORBING INNER HEAT EXCHANGER | OUTER HEAT EXCHANGER |
|---|---|---|---|---|---|---|---|---|
| | 1ST | 2ND | 1ST | 2ND | 3RD | | | |
| | 90 | 91 | 92 | 93 | 94 | 33 | 35 | 38 |
| COOLING | CONT. LINE | CONT. LINE | OPEN | CLOSE | OPEN | CONDENSER | EVAPORATOR | CONDENSER |
| HEATING | CONT. LINE | CONT. LINE | CLOSE | OPEN | CLOSE | CONDENSER | EVAPORATOR | NOT USED |
| WEAK HEATING | DOTTED LINE | DOTTED LINE | OPEN | CLOSE | OPEN | CONDENSER | EVAPORATOR | EVAPORATOR |

FIG.7

| MODE | FOUR-WAY VALVE | | REFRIGERANT CONTROL VALVE | HEAT-RADIATING INNER HEAT EXCHANGER | HEAT-ABSORBING INNER HEAT EXCHANGER | OUTER HEAT EXCHANGER |
|---|---|---|---|---|---|---|
| | 1ST | 2ND | | | | |
| | 90 | 91 | 97 | 33 | 35 | 38 |
| COOLING | CONT. LINE | CONT. LINE | OPEN | CONDENSER | EVAPORATOR | CONDENSER |
| HEATING | DOTTED LINE | CONT. LINE | CLOSE | CONDENSER | EVAPORATOR | NOT USED |
| WEAK HEATING | DOTTED LINE | DOTTED LINE | CLOSE | CONDENSER | EVAPORATOR | EVAPORATOR |

FIG.9

| MODE | FOUR-WAY VALVE | | REFRIGERANT FLOW SWITCHING VALVE | | | HEAT-RADIATING INNER HEAT EXCHANGER | HEAT-ABSORBING INNER HEAT EXCHANGER | OUTER HEAT EXCHANGER |
|---|---|---|---|---|---|---|---|---|
| | 1ST | 2ND | 2ND | 3RD | | 33 | 35 | 38 |
| | 90 | 91 | 93 | 94 | | | | |
| COOLING | CONT. LINE | CONT. LINE | CLOSE | OPEN | | CONDENSER | EVAPORATOR | CONDENSER |
| HEATING | DOTTED LINE | DOTTED LINE | OPEN | CLOSE | | CONDENSER | EVAPORATOR | NOT USED |
| WEAK HEATING | DOTTED LINE | DOTTED LINE | CLOSE | OPEN | | CONDENSER | EVAPORATOR | EVAPORATOR |

FIG.11

| MODE | FOUR-WAY VALVE | | REFRIGERANT FLOW SWITCHING VALVE | | HEAT-RADIATING INNER HEAT EXCHANGER | HEAT-ABSORBING INNER HEAT EXCHANGER | OUTER HEAT EXCHANGER |
|---|---|---|---|---|---|---|---|
| | 1ST 90 | 2ND 91 | 1ST 92 | 2ND 93 | 33 | 35 | 38 |
| COOLING | CONT. LINE | CONT. LINE | OPEN | CLOSE | CONDENSER | EVAPORATOR | CONDENSER |
| HEATING | CONT. LINE | CONT. LINE | CLOSE | OPEN | CONDENSER | EVAPORATOR | NOT USED |
| MILD HEATING | DOTTED LINE | DOTTED LINE | OPEN | CLOSE | CONDENSER | EVAPORATOR | EVAPORATOR |

FIG.13

| MODE | FOUR-WAY VALVE | | HEAT-RADIATING INNER HEAT EXCHANGER | HEAT-ABSORBING INNER HEAT EXCHANGER | OUTER HEAT EXCHANGER |
|---|---|---|---|---|---|
| | 1ST 90 | 2ND 91 | 33 | 35 | 38 |
| COOLING | CONT. LINE | CONT. LINE | CONDENSER | EVAPORATOR | CONDENSER |
| HEATING | DOTTED LINE | CONT. LINE | CONDENSER | EVAPORATOR | NOT USED |
| WEAK HEATING | DOTTED LINE | DOTTED LINE | CONDENSER | EVAPORATOR | EVAPORATOR |

FIG.15

| MODE | FOUR-WAY VALVE | | HEAT-RADIATING INNER HEAT EXCHANGER | HEAT-ABSORBING INNER HEAT EXCHANGER | OUTER HEAT EXCHANGER |
|---|---|---|---|---|---|
| | 1ST | 2ND | | | |
| | 90 | 91 | 33 | 35 | 38 |
| COOLING | CONT. LINE | CONT. LINE | CONDENSER | EVAPORATOR | CONDENSER |
| HEATING | DOTTED LINE | CONT. LINE | CONDENSER | EVAPORATOR | NOT USED |
| WEAK HEATING | DOTTED LINE | DOTTED LINE | CONDENSER | EVAPORATOR | EVAPORATOR |

FIG.18

| MODE | FOUR-WAY VALVE ||| HEAT-RADIATING INNER HEAT EXCHANGER | HEAT-ABSORBING INNER HEAT EXCHANGER | OUTER HEAT EXCHANGER |
|---|---|---|---|---|---|---|
| | 1ST 90 | 2ND 91 | 3RD 99 | 33 | 35 | 38 |
| COOLING | CONT. LINE | CONT. LINE | CONT. LINE | CONDENSER | EVAPORATOR | CONDENSER |
| HEATING | DOTTED LINE | CONT. LINE | CONT. LINE | CONDENSER | EVAPORATOR | EVAPORATOR |
| WEAK HEATING | DOTTED LINE | DOTTED LINE | CONT. LINE | CONDENSER | EVAPORATOR | EVAPORATOR |
| SIMPLE HEAT PUMP TYPE HEATING | DOTTED LINE | DOTTED LINE | DOTTED LINE | CONDENSER | NOT USED | EVAPORATOR |

FIG.20

| MODE | FOUR-WAY VALVE | | | HEAT-RADIATING INNER HEAT EXCHANGER 33 | HEAT-ABSORBING INNER HEAT EXCHANGER 35 | OUTER HEAT EXCHANGER 38 |
|---|---|---|---|---|---|---|
| | 1ST 90 | 2ND 91 | 3RD 99 | | | |
| COOLING | CONT. LINE | CONT. LINE | CONT. LINE | CONDENSER | EVAPORATOR | CONDENSER |
| HEATING | DOTTED LINE | CONT. LINE | CONT. LINE | CONDENSER | EVAPORATOR | NOT USED |
| WEAK HEATING | DOTTED LINE | DOTTED LINE | CONT. LINE | CONDENSER | EVAPORATOR | EVAPORATOR |
| SIMPLE HEAT PUMP TYPE HEATING | DOTTED LINE | DOTTED LINE | DOTTED LINE | CONDENSER | NOT USED | EVAPORATOR |

AIR CONDITIONER FOR VEHICLE

BACKGROUND OF THE INVENTION

1. Field of the Invention

The present invention relates to improvements in an air conditioner for a vehicle which is provided with a vapor-compression cycle.

2. Description of the Prior Art

Japanese Patent Provisional Publication No. 2-290475 discloses an air conditioner for a vehicle in which a four-way valve 2 is used in order to change refrigerant flow in the air conditioner by each of a heating operation and a cooling operation, as shown in FIG. 21. That is, during the heating operation, an outer heat exchanger 7 is used as an evaporator and inner heat exchangers 3 and 5 are used as a condenser. On the other hand, during the cooling operation, the outer heat exchanger 7 is used as a condenser and the inner heat exchangers 3 and 5 are used as an evaporator. More particularly, as shown in FIG. 21, during the heating operation, the four-way valve 2 is set as indicated by a continuous line, and refrigerant is circulated as follows: A compressor 1→the four-way valve 2→a first inner heat exchanger 3→a heating heat exchanger 4→a second inner heat exchanger 5→an expansion valve 6→an outer heat exchanger 7→the four-way valve 2→a receiver 8→the compressor 1. Accordingly, the heat of the refrigerant is transmitted to air blown by a blower fan 9 and used for heating a passenger compartment. The heat from an engine 10 is transmitted to the refrigerant through the heating heat exchanger 4 and further transmitted from the refrigerant to air blown by a blower fan 11 for heating the passenger compartment. The heat of the air blown by a fan 12 is transmitted to the refrigerant through the outer heat exchanger 7. On the other hand, during the cooling operation, the four-way valve 2 is set as indicated by a broken line in FIG. 21 and refrigerant is circulated as follows: The compressor 1→the outer heat exchanger 7→the expansion valve 6→the second inner heat exchanger 5→the first inner heat exchanger 3→the four-way valve 2→the receiver 8→the compressor 1. Accordingly, the heat of the refrigerant discharged from the compressor 1 is radiated into the atmosphere through the outer heat exchanger 7, and the heat of air led by the blower fans 9 and 11 is radiated into the refrigerant by the first and second inner heat exchanger 3 and 5. Further, the cooled air is supplied to the passenger compartment.

With such a conventional air conditioner, the absorbed heat amount by the outer heat exchanger 7 is decreased during the heating operation under a condition such that the ambient temperature is low, the automotive vehicle is running, or it is raining or snowing. Furthermore, if the workload of the compressor 1 is constant, the radiated heat amount from the first and second inner heat exchangers 3 and 5, which is the sum of the heat absorbing amount from the outer heat exchanger 7 and the workload of the compressor 1, is decreased. This decreases the heating capacity of the air conditioner. Additionally, the decrease of the heating capacity invites the frost to the heat exchanger. This increases a defrost operation and prevents a stable heating operation. Furthermore, since the conventional air conditioner is arranged such that the flow direction of the refrigerant is changed by each of the cooling and heating operations, it is necessary to rearrange the design of the conduits of the outer and inner heat exchangers 7, 3 and 5 so as to be durable to high temperature and high pressure. Also, since the conventional air conditioner is arranged to generate heated air for the heating by utilizing the waste heat of the engine 10 during the heating operation, this air conditioner can not sufficiently operate if applied to a vehicle which only has small heat source, such as to a solar car or electric vehicle.

On the other hand, the applicant of this invention has disclosed a new-type air conditioner for a vehicle in U.S. patent application Ser. No. 07/995,096. The air conditioner is provided with a heat-radiating inner heat exchanger 235 in addition to a heat-absorbing inner heat exchanger 233 and is arranged to change an operation mode by controlling a three-way valve 232. With this arrangement, it is possible to improve the air-conditioning performance by a stable control without being effected by the weather condition. More particularly, the construction of this air conditioner is arranged as shown in FIG. 22. Accordingly, during the heating operation, the three-way valve 232 is switched as indicated by a continuous line, and the refrigerant in the air conditioner is circulated as follows: A compressor 231→the three-way valve 232→a heat-radiating inner heat exchanger 233→a receiver 236→an expansion valve 234→a heat-absorbing inner heat exchanger 235→the compressor 231. Accordingly, the air blown by a blower fan is cooled at the heat-absorbing inner heat exchanger 235 for a cooling dehumidification, and then is warmed at the heat-radiating inner heat exchanger 233. During a cooling operation, the three-way valve 232 is switched as indicated by a dotted line, and the refrigerant is circulated as follows: The compressor 231→the three-way valve 232→an outer heat exchanger 238→a one-way valve 270→the heat-radiating inner heat exchanger 233→the receiver 236→the expansion valve 234→the heat-absorbing inner heat exchanger 235→the compressor 231. Accordingly, the heat of the refrigerant is radiated through the outer heat exchanger 238, the air blown by the blower fan is cooled at the heat-absorbing inner heat exchanger 235.

With this air conditioner, since the refrigerant by-passes the outer heat exchanger 238 during the heating operation, even if the ambient air temperature is lower than 5° C., the air conditioner operates without causing the freezing of the outer heat exchanger 238. On the other hand, when the input to the compressor 231 is W, the quantity of heat used for a cool-dehumidification of the air is QE, and the quantity of heat applied to the air at the heat-radiating heat exchanger 233 is QC, the following equation is obtained:

$$W = QC - QE$$

Since the air in the passenger compartment is QC−QE, it is noted that the workload of the compressor 231 is used for the heating of the air supplied to the passenger compartment. That is, it is possible to control the compartment temperature by the control of the compressor. Therefore, when the ambient air temperature is ranging from 5° C. to 15° C., it is possible to implement a weak heating operation by controlling an input to the compressor 231.

However, when the ambient air temperature is ranging from 5° C. to 15° C., the outer heat exchanger 238 is not used although it is possible to use the outer heat exchanger 238 as a condenser. This prevents the coefficient of the performance of the air conditioner from being larger than 1.

SUMMARY OF THE INVENTION

It is an object of the present invention to provide an improved air conditioner for a vehicle which enables the heating operation under wide-range cold condition from an instensely cold condition to a slightly cold condition.

An air conditioner for a vehicle according to the present invention comprises refrigerant and a compressor which applyies a workload to the refrigerant. An outer heat exchanger transmits heat between the refrigerant and ambient air. A blower leads air for air-conditioning a passenger compartment of the vehicle. A heat-radiating inner heat exchanger transmits the heat of the refrigerant to the air led by the blower. An expansion valve adiabatically expands the refrigerant. A heat-absorbing inner heat exchanger transmits the heat of the air led by the blower to the refrigerant. A refrigerant passage switching device is arranged to switch a refrigerant flow among the compressor, the outer heat exchanger, the heat-radiating inner heat exchanger, the expansion valve and the heat-absorbing inner heat exchanger. The refrigerant passage switching device is set at one of a cooling mode, a heating mode and a weak heating mode. During a cooling operation of the air conditioner the refrigerant passage switching device is set at the cooling mode in which the refrigerant flows in the order of the compressor, the outer heat exchanger, the expansion valve, the heat-absorbing inner heat exchanger and the compressor. During a heating operation of the air conditioner the refrigerant passage switching device is set at the heating mode in which the refrigerant flows in the order of the compressor, the heat-radiating inner heat exchanger, the expansion valve, the heat-absorbing inner heat exchanger and the compressor while bypassing the outer heat exchanger. During a weak heating operation of the air conditioner the refrigerant passage switching device is set at the weak heating mode in which the refrigerant flows in the order of the compressor, the heat-radiating inner heat exchanger, the expansion valve, the outer heat exchanger and the compressor.

With this arrangement, the air conditioner functions such that the heating operation is implemented in wide-range cold circumstances from an intensely cold condition to a slightly cold condition. Furthermore, this air conditioner operates such that a coefficient of its performance is larger than 1 under a slightly cold condition. This enables the air conditioner to reduce its energy consumption.

BRIEF DESCRIPTION OF THE DRAWINGS

In the drawings, like reference numerals designate like parts and like elements throughout all figures; in which:

FIG. 5 is a table which shows a control of four-way valves and the like in the first embodiment of FIG. 1;

FIG. 7 is a table which shows a control of four-way valves and the like in the second embodiment of FIG. 6;

FIG. 9 is a table which shows a control of four-way valves and the like in the third embodiment of FIG. 8;

FIG. 11 is a table which shows a control of four-way valves and the like in the fourth embodiment of FIG. 10;

FIG. 13 is a table which shows a control of four-way valves and the like in the fifth embodiment of FIG. 12;

FIG. 15 is a table which shows a control of four-way valves and the like in the sixth embodiment of FIG. 14;

FIG. 18 is a table which shows a control of four-way valves and the like in the seventh embodiment;

FIG. 20 is a table which shows a control of four-way valves and the like in the eighth embodiment of FIG. 19;

DETAILED DESCRIPTION OF THE INVENTION

Referring to FIGS. 1 to 5, there is shown a first embodiment of an air conditioner for an automotive vehicle according to the present invention.

Figure 1:
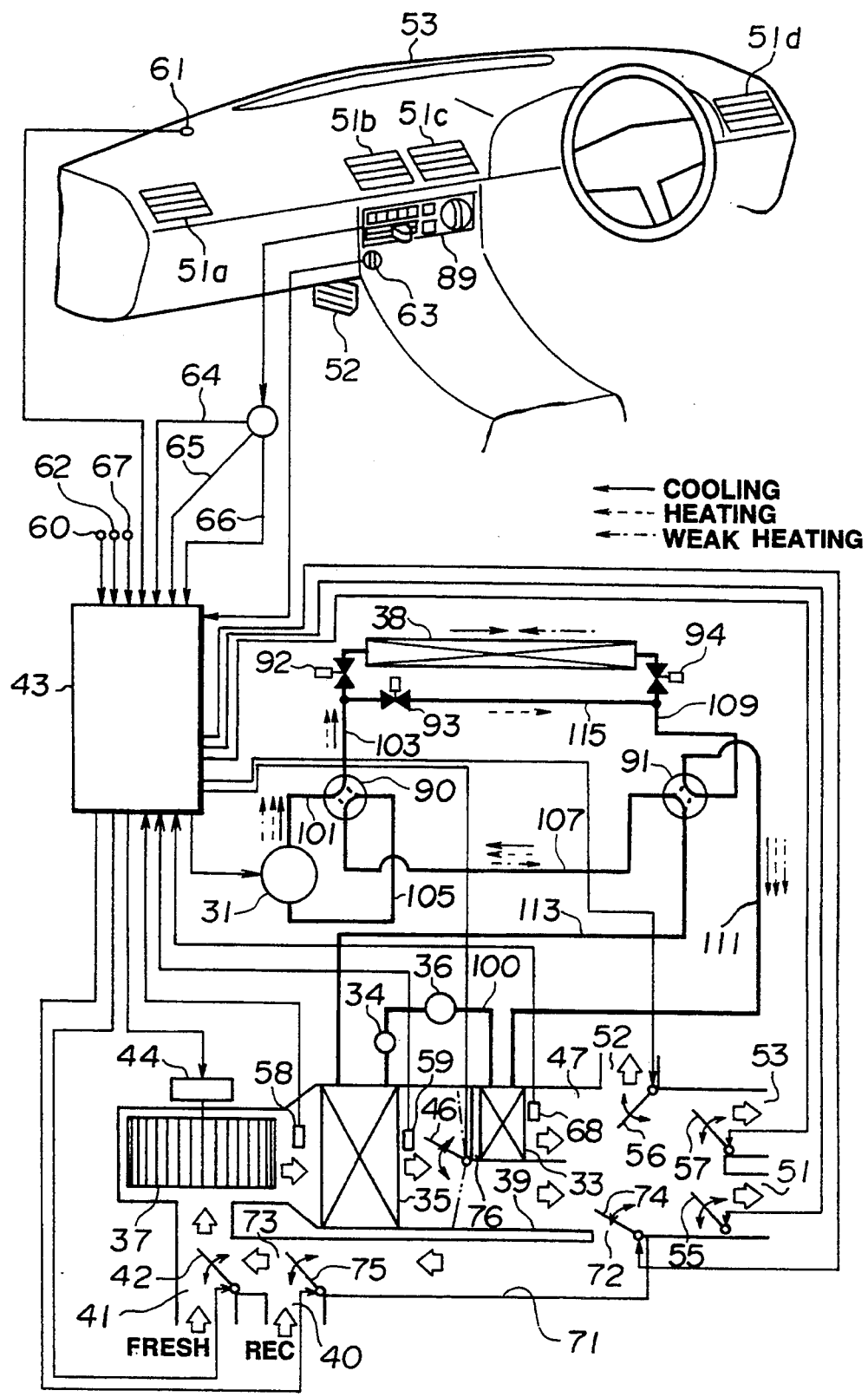
FIG. 1 is a schematic structural view of a first embodiment of an air conditioner for a vehicle according to the present invention.
Figure 2:
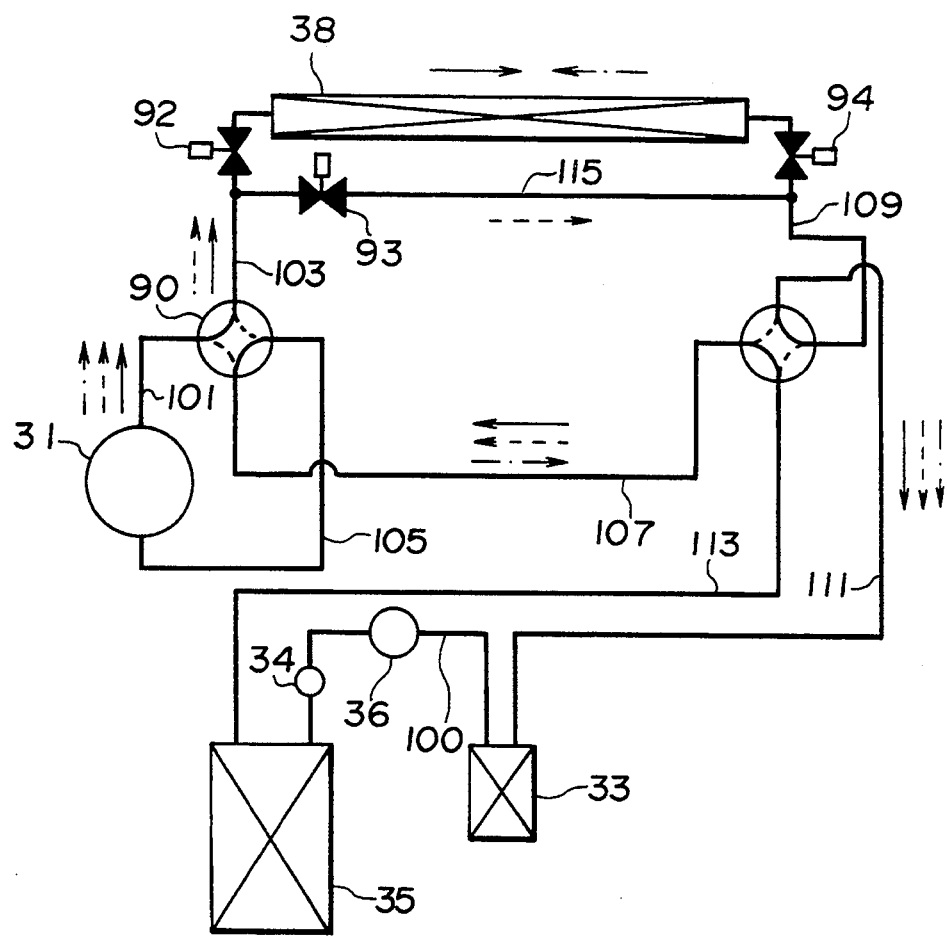
FIG. 2 is a view which shows a refrigerant flow during each operation mode in the first embodiment of FIG. 1.

As shown in FIGS. 1 and 2, a compressor 31 is disposed outside of a passenger compartment of the automotive vehicle, such as in an engine room. The compressor 31 is of a type which variably changes an input power, such as of an electric drive type or hydraulic drive type. An outer heat exchanger 38, a heat-radiating heat inner heat exchanger 33, an expansion valve functioning as an expansion means, and a heat-absorbing inner heat exchanger 35 are connected to the compressor 31 through a refrigerant passage switching means which is constituted by first and second four-way valves 90 and 91 and a bypass means which is constituted by first and second switching valves 92 and 93 so as to form a predetermined passage relative to the outer heat exchanger 38.

The outer heat exchanger 38 functions to transmit the heat between the refrigerant and the ambient air. That is, the outer heat exchanger 38 functions as an outer condenser which radiates heat of the refrigerant discharged from the compressor 31 into the ambient air, or functions as an outer evaporator which transmits heat from the ambient air to the refrigerant splayed from an expansion valve 34.

The heat-radiating inner heat exchanger 33 is disposed in a duct 39 serving as a main body of the air conditioner. The duct 39 is located at a front portion of the passenger compartment, such as at a back side of an instrument panel. A blower fan 37 functioning as a blowing means is disposed near an inlet of the duct 39. The heat-radiating inner heat exchanger 33 functions as an inner condenser of a radiating type in which heat of the refrigerant discharged from the compressor 31 is radiated into the air forced by the blower fan 37.

The refrigerant outlet side of the heat-radiating inner heat exchanger 33 is connected to a refrigerant inlet side of a heat-absorbing inner heat exchanger 35 through a conduit 100. A receiver 36 and the expansion valve 34 are disposed in the conduit 100. The expansion valve 34 functions in the air conditioner so as to atomize liquid refrigerant by the adiabatic expansion.

The heat-absorbing inner heat exchanger 35 functions as a heat-absorbing type evaporator which cools the air forced by the blower fan 37, in a manner to absorb the heat of the air into the refrigerant supplied from the expansion valve 34.

The first four-way valve 90 is connected to the suction side and the discharge side of the compressor 31 through conduits 101 and 105, respectively. Further, the first four-way valve 90 is connected to the refrigerant inlet side of the outer heat exchanger 38 and the second four-way vale 91 through conduits 103 and 107, respectively.

The second four-way valve 91 is connected to the first four-way valve 90 and the refrigerant outlet side of the outer heat exchanger 38 through the conduit 107 and a conduit 109, respectively. Further, the second four-way valve 91 is connected to the refrigerant inlet side of the heat-radiating inner heat exchanger 33 and the refrigerant outlet side of the heat-absorbing inner heat exchanger 35 through conduits 111 and 113.

The first switching valve 92 which is set at one of an open state and a closed state is disposed in the conduit 103, and the second switching valve 92 which is set at one of an open state and a closed state is disposed in a conduit 115 which connects the conduit 103 and the conduit 109.

A third switching valve 94 which is set at one of an open state and a closed state is disposed in the conduit 109.

An auxiliary heater 76 is disposed at an air inlet side of the heat-radiating inner heat exchanger 33. The auxiliary heater 76 is an electric heater and of a type which variably changes output according to input voltage controlled by a control unit 43. When the auxiliary heater 76 is turned on, the air passing through the heat-radiating inner heat exchanger 33 is heated, and the temperature of the refrigerant which flows through the heat-radiating inner heat exchanger 33 is increased.

In the duct 39, an inner air inlet 40 for leading the air into the passenger compartment and an outer air inlet 41 for leading outside air due to the wind pressure caused by the running of the automotive vehicle are disposed upstream of the heat-absorbing inner heat exchanger 35. An intake door 42 for properly mixing the air from the inner air inlet 40 and the air from the outer air inlet 41 is disposed at-a dividing portion between the inner and outer air inlets 40 and 41 in the duct 39. The intake door 42 is arranged to open and close the outer air inlet 41 by using an intake door actuator (not shown) controlled by the control unit 43. The blower fan 37 is disposed downstream of the inner and outer air inlets 40 and 41 and upstream of the heat-absorbing inner heat exchanger 35 in the duct 39. The blower fan 37 is arranged to be rotated by a blower fan motor 44 which is controlled by the control unit 43.

An air mixing door 46 is disposed upstream of the heat-radiating inner heat exchanger 33 in the duct 39. The air mixing door 46 is driven by an air mixing door actuator (not shown) controlled by the control unit 43 so as to change the ratio of air flow rates of cool air and hot air, wherein the cool air is air which bypasses the heat-radiating inner heat exchanger 33 and the hot air is the air which passes through the heat-radiating inner heat exchanger 33. An opening degree $X_{dsc}$ of the air mixing door 46 is defined as follows: When the air mixing door 46 is located at a position indicated by a long and short dash line in FIG. 1, that is, when the ratio of the cool air is 100%, the opening degree $X_{dsc}$ is defined as 0% (full close condition). When the air mixing door 46 is located at a position indicated by a long and two short dashes line in FIG. 1, that is, when the ratio of the hot air is 100%, the opening degree $X_{dsc}$ is defined as 100% (full open condition).

In order to further improve the mixing between cool air and hot air, an air mixing chamber 47 is disposed downstream of the heat-radiating inner heat exchanger 33 in the duct 39. The air mixing chamber 47 has a ventilator outlet 51 (51a, 51b, 51c, 51d) for feeding the conditioned air toward an upper side of a vehicle passenger (not shown), a foot outlet 52 (52a) for feeding the conditioned air toward a foot portion of the vehicle passenger, and a defroster outlet 53 (53a) for feeding the conditioned air toward a front glass (not shown) of the automotive vehicle. A ventilator door 55, a foot door 56, and a defroster door 57 are disposed in the air mixing chamber 47. The ventilator door 55 is arranged to open and close the ventilator outlet 51 according to the operation of a ventilator door actuator (not shown) which is controlled by the control unit 43. The foot door 56 is arranged to open and close the foot outlet 52 according to the operation of a foot door actuator (not shown) which is controlled by the control unit 43. The defroster door 57 is arranged to open and close the defroster outlet 53 according to the operation of a defroster door actuator (not shown) which is controlled by the control unit 43.

A circulation passage 71 is disposed to communicate the air mixing chamber 47 and the inner air inlet 40. An inlet door 74 is disposed at an opening 72 of the circulation passage 71 which opening is formed in the vicinity of the air mixing chamber 47 in the duct 39. An outlet door 75 is disposed at a branch portion 73 between the circulation passage 71 and the inner air inlet 40. The inlet door 74 is arranged to open and close the opening 72 by means of an inlet door actuator (not shown) which is driven according to a signal from the control unit 43. The outlet door 75 is arranged to change a communicating condition of the branch portion 73 by means of an outlet door actuator (not shown) which is driven according to a signal from the control unit 43. That is, the conditioned air is circulated from the air mixing chamber 47 to an upstream side of the blower fan 37 when the inlet door 74 and the outlet door 75 are opened wherein the outlet door 75 is positioned to close the inner air port 40.

The control unit 43 is connected to thermal information detecting means such as an inlet air temperature sensor 58 for the heat-absorbing inner heat exchanger 35, an outlet air temperature sensor 59 for the heat-absorbing inner heat exchanger 35, an outlet air temperature sensor 60 for the ventilator outlet 51, a solar radiation sensor 61, an outer air (ambient) temperature sensor 62, a room air temperature sensor 63, a room air temperature setting device 64 which is disposed in an air-conditioner panel 89, an outlet-port mode switch 65, a blower fan switch 66, a refrigerant temperature sensor 67, and an outlet air temperature sensor 68 of the heat-radiating inner heat exchanger 33.

The control unit 43 calculates target air-conditioned state, such as an opening degree $X_{dsc}$ of the air mixing door 46, and an input value $W_{comp}$ of the compressor 31, an air flow rate $V_{eva}$ passing through the heat-absorbing inner heat exchanger 35, and a target outlet air temperature $T_{of}$ according to thermal information from the thermal information detecting means. Furthermore, on the basis of the calculated values, the control unit 43 controls the compressor 31, the first and second four-way valves 90 and 91, the first, second and third switching valves 92, 93 and 94, the blower fan motor 44, the air-mixing door actuator, the return door actuator, the ventilator door actuator, the foot door actuator, and the defroster door actuator so as to correspond the air-conditioned state with the calculated target air-conditioned state. The inlet air temperature sensor 58 detects an inlet air temperature $T_{suc}$ and sends it to the control unit 43. The outlet air temperature sensor 59 detects an outlet air temperature $T_{out}$ and sends it to the control unit 43. The blowout air temperature sensor 60 detects a ventilator outlet air temperature $T_{vent}$ and sends it to the control unit 43. The solar radiation sensor 61 detects a solar radiation amount $Q_{sun}$ to the vehicle and sends it to the control unit 43. The ambient air temperature sensor 62 detects an ambient air temperature $T_{amb}$ and sends it to the control unit 43. The room air temperature sensor 63 detects a room air temperature $T_{room}$ and sends it to the control unit 43. A preset room temperature $T_{ptc}$ set at the room temperature setting device 64 is sent to the control unit 43. The refrigerant temperature sensor 67 detects a refrigerant temperature $T_{ref}$ of the refrigerant outlet of the heat-radiating inner heat exchanger 33 and sends it to the control unit 43. The outlet air temperature sensor 68 detects the outlet air temperature $T_v$ and sends it to the control unit 43. Such detected data function as the thermal information.

Accordingly, in the first embodiment of the air conditioner according to the present invention, the room air temperature sensor 63 functions as a means for detecting a thermal condition in the passenger compartment, the room temperature setting device 64 functions as a means for setting a thermal condition in the passenger compartment, the control unit 43 functions as a means for controlling the compressor 31 according to the thermal condition detecting and setting means. Furthermore, the control unit 43 functions as a switch controlling means which controls the switching of the first and second four-way valves 90 and 91, and the first and second switching valves 92 and 93 according to the thermal condition detecting and setting means.

With reference to a flow chart of FIGS. 3 to 4, the manner of controlling operation of the first embodiment of the air conditioner will be discussed hereinafter.

Figure 3:
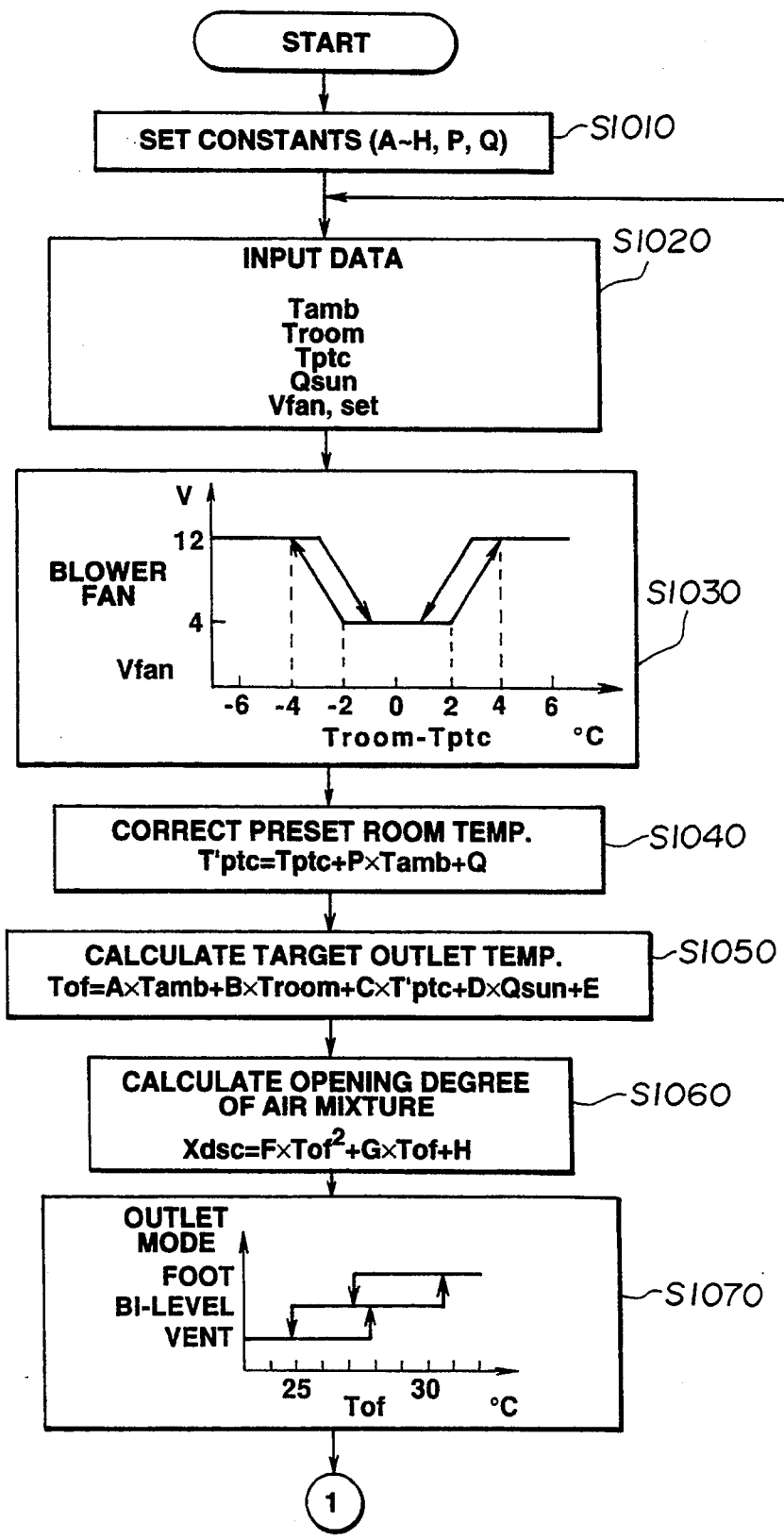
FIG. 3 is a part of a flow chart which is applied to the control of the first embodiment of FIG. 1.
Figure 4:
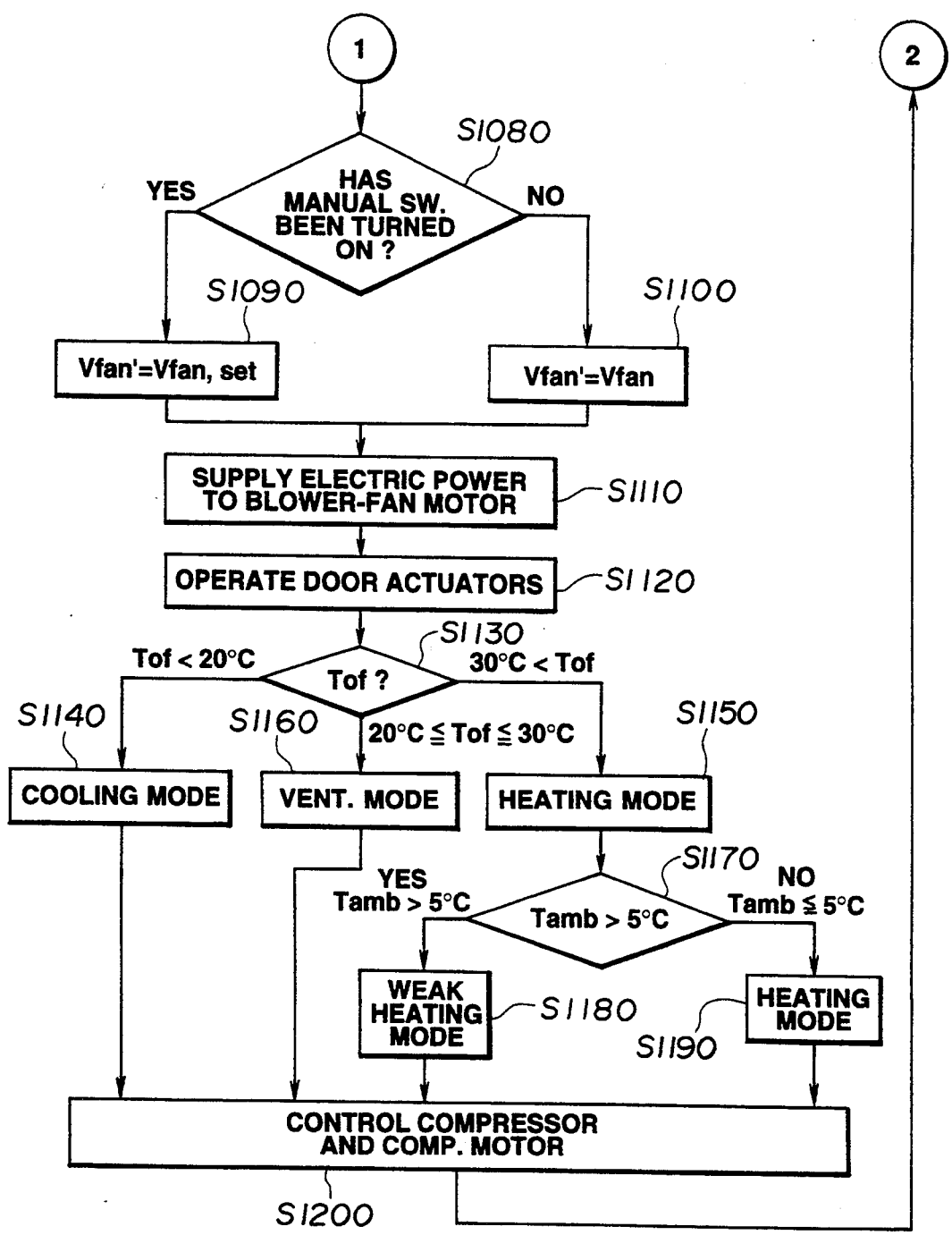
FIG. 4 is another part of the flow chart which is applied to the control of the first embodiment of FIG. 1.

The flow chart shown in FIG. 3 starts processing with the start of the control unit 43 which is turned-on by the turning-on of a main switch of the air conditioner. As shown in FIG. 3, in a step S1010, constants A to H, P, and Q are set in the control unit 43. The constants A to E are applied to an equation by which the target outlet air temperature $T_{of}$ is calculated; the constants F, G, and H are applied to an equation by which the opening degree X of the air mixing door 46 is calculated; and the constants P and Q are used as a correction of the preset room temperature.

In a step S1020, the control unit 43 reads on the outputs from the various sensors (the thermal information detecting means), such as output signals indicative of the room air temperature $T_{room}$ from the room air temperature sensor 63, an output signal indicative of the solar radiation $Q_{sun}$ of the solar radiation sensor 61, an output signal indicative of the ambient air temperature $T_{amb}$ of the ambient air temperature sensor 62, an output signal indicative of the preset room air temperature $T_{ptc}$ of the room air temperature setting device 64, and an output signal indicative of a preset value $V_{fan,set}$ of the fan switch.

In a step S1030, the applied voltage $V_{fan}$ of the blower fan 37 is determined according to a difference $(T_{room}-T_{ptc})$ between the preset room air temperature $T_{ptc}$ and the room air temperature $T_{room}$, in order to control the air flow rate caused by the blower fan 37. In concrete terms, as is clear from a graph shown in the step S1030, the applied voltage $V_{fan}$ is increased in accordance with the increase of the difference $(T_{room}"T_{ptc})$ so as to rapidly approach the room air temperature $T_{room}$ to the preset room air temperature $T_{ptc}$.

In a step S1040, the correction of the preset room air temperature $T_{ptc}$ is implemented by using the following equation:

$$T'_{ptc}=T_{ptc}+P\times T_{amb}+Q$$

In concrete terms, when the ambient air temperature $T_{amb}$ is low, the preset room air temperature is increase. When the ambient air temperature is high, the preset room air temperature is decreased. This correction is implemented by the following reason: Normally, men feel cool when the room air temperature is lowered under an environment where men feel hot, and feel warm when the room air temperature is increased under an environment where men feel cold. Thus, by correcting the preset room air temperature so as to be in reverse proportion to an environmental temperature, men receive thermal stimulation and obtain amenity.

In a step S1050, the target outlet air temperature $T_{of}$ is calculated by using the following equation:

$$T_{of}=A\times T_{amb}+B\times T_{room}+C\times T'_{ptc}+D\times Q_{sun}+E$$

where A, B, C, D, and E are constant, $T_{amb}$ is the ambient air temperature, $T_{room}$ is the room air temperature, $T'_{ptc}$ is a corrected preset room air temperature, and $Q_{sun}$ is the solar radiation amount.

In a step S1060, the opening degree X of the air mixing door 46 is calculated on the basis of the target outlet air temperature $T_{of}$ by the following equation:

$$X=F\times T_{of}^2+G\times T_{of}+H$$

where F, G, and H are constants.

In a step S1070, the outlet-port mode is determined on the basis of the target outlet air temperature $T_{of}$. That is, when the target outlet air temperature $T_{of}$ is high, the foot mode is selected so as to feed the conditioned air to passenger's feet. When medium, the bi-level mode is selected so as to feed the conditioned air to passenger's feet and breast. When low, the vent mode is selected so as to feed the conditioned air to passenger's breast.

In a step S1080, it is judged whether a manual fan switch (no numeral) disposed in the air-conditioner panel 89 is turned on by a passenger or not. When the manual fan switch is turned on, the program proceeds to a step S1090 wherein the value $V_{fan,set}$ is determined as a final value (fan preset value $V_{fan'} = V_{fan,set}$). When the manual fan switch is not turned on, the program proceeds to a step S1100 wherein the value determined in the step S1030 is used as the blower fan voltage ($V_{fan'} = V_{fan}$).

In a step S1110, the blower fan voltage $V_{fan,set}$, which is determined in the step S1090 or step S1100, is applied to the blower fan motor 44.

In a step S1120, the corresponding signals are outputted to the door actuators such that the corresponding doors are automatically disposed at predetermined positions, respectively. Following this, the program proceeds to a step S1130.

In the step S1130, it is judged which operation mode should be selected. That is, it is judged whether the target outlet air temperature $T_{of}$ is lower than 20° C., or higher than 30° C. When the target outlet air temperature $T_{of}$ is lower than 20° C. ($T_{of} < 20°$ C.), the program proceeds to a step S1140 wherein a cooling mode is selected to implement the cooling operation. When the target outlet air temperature $T_{of}$ is higher than 30° C. ($T_{of} > 30°$ C.), the program proceeds to a step S1150 wherein a heating mode is selected to implement the heating operation. When the target outlet air temperature $T_{of}$ is not lower than 20° C. and not higher than 30° C. (20° C. $\leq T_{of} \leq$ 30° C.), the program proceeds to a step S1160 wherein a vent mode is selected to implement a ventilating operation.

After the implement of the step S1140 or S1160, the program proceeds to a step S1200 wherein the compressor control and the compressor-motor control are implemented to control the input to the compressor 31.

Following the step S1150, the program proceeds to a step S1170 wherein it is judged whether the weak heating operation is selected or not. That is, it is judged whether the ambient air temperature $T_{amb}$ is higher than 5° C. or not. When the judgment in the step S1170 is "YES" ($T_{amb} > 5°$ C.), the program proceeds to a step S1180 wherein a weak heating mode is selected to implement the weak heat operation. When the judgment in the step S1170 is "NO" ($T_{amb} \leq 5°$ C.), the program proceeds to a step S1190 wherein the heating mode is selected to implement the heating operation.

Following this, the program proceeds to the step S1200 wherein the compressor control and the compressor-motor control are implemented to control the input to the compressor 31.

The operating condition of the valves and the heat exchangers in the above-mentioned control is represented by a table of FIG. 5. That is, during the cooling operation, the first and second four-way valves 90 and 91 are switched as indicated by a continuous line, the first and second switching valves 92 and 93 are closed, and the third switching valve 94 is opened. Further, the heat-radiating inner heat exchanger 33 functions as a condenser, the heat-absorbing inner heat exchanger 35 functions as an evaporator, and the outer heat exchanger 38 functions as a condenser.

Accordingly, as shown in FIGS. 1 and 2, during the cooling operation, the refrigerant is circulated as follows: The compressor 31→the conduit 101→the first four-way valve 90→the first switching valve 92 in the conduit 103→the outer heat exchanger 38→the third switching valve 94 in the conduit 109→the second four-way valve 91→the conduit 111→the heat-radiating inner heat exchanger 33→the receiver 36 and the expansion valve 34 in the conduit 100→the heat-absorbing inner heat exchanger 35→the conduit 113→the second four-way valve 91→the conduit 107→the first four-way valve 90→the conduit 105→the compressor 31. Accordingly, the outer heat exchanger 38 radiates the heat of the high-temperature refrigerant discharged from the compressor 38, and the remaining heat of the refrigerant is radiated into the air blown by the blower fan 37 or the air forced by a ram pressure during a vehicle running through the heat-radiating inner heat exchanger 33. Furthermore, Air led by the blower fan 37 or the air forced by a ram pressure during a vehicle running is cooled by the refrigerant passing through the heat-absorbing inner heat exchanger 35.

During the heating operation, the refrigerant is circulated as follows: The compressor 31→the conduit 101→the four-way valve 90→the conduit 103→the second switching valve 93 in the conduit 115→the conduit 109→the second four-way valve 91→the conduit 111→the heat-radiating inner heat exchanger 33→the receiver 36 and the expansion valve 34 in the conduit 100→the heat-absorbing inner heat exchanging 35→the conduit 113→the second four-way valve 91→the conduit 107→the four-way valve 90→the conduit 105→the compressor 31. Accordingly, the heat-radiating inner heat exchanger 33 generates heated air by radiating the heat of the refrigerant discharged from the compressor 31 into the air blown by the blower fan 37 or the air forced by a ram pressure during a vehicle running condition. Therefore, the dehumidified air is generated at the heat absorbing inner heat exchanger 35, and the heat-radiating inner heat exchanger 33 generates the heated air in sufficient amount. This enables a dehumidifying heating and therefore even if the vehicle is put under the condition that the ambient air temperature is lower than 5° C., the sufficient heating operation is implemented without inviting the fogging of the windows. Furthermore, since the outer heat exchanger 38 is not used during the heating operation, even if it is put under an intensely cold ambient condition such that the outer heat exchanger 38 will freeze, it is possible to implement the heating operation sufficiently.

During the weak heating operation, the refrigerant is circulated as follows: The compressor 31→the conduit 101→the first four-way valve 90→the conduit 107→the second four-way valve 91→the conduit 111→the heat-radiating inner heat exchanger 33→the receiver 36 and the expansion valve 34 in the conduit 100→the heat-absorbing inner heat exchanger 35→the conduit 113→the second four-way valve 91→the third switching valve 94 in the conduit 109→the outer heat exchanger 38→the first switching valve 92 of the conduit 103→the first four-way valve 90→the conduit 105→the compressor 31. Accordingly, it is possible to implement the dehumidifying heating by generating cool air at the heat-absorbing inner heat exchanger 35 and generating warm air at the heat-radiating inner heat exchanger 33. Furthermore, since it is possible to absorb heat from the ambient air which is higher than 5° C., the outer heat exchanger 38 can absorb the heat from the ambient air. Therefore, it is possible to increase a coefficient of a performance of the system to be higher than 1 by implementing the weak heating operation under a slightly cold condition.

That is, when the workload of the compressor 31 is W, the heating amount used for dehumidifying the air in the passenger compartment is QE, the heating amount used for heating the air in the passenger compartment is QC, and the heating amount absorbed from the ambient air is QA, the following relationship is obtained:

$$W = QC - (QE + QA)$$

Since the total heating amount of the air in the passenger compartment is QC−QE, the coefficient of the performance of the air conditioner is represented as follows:

$$\epsilon = (QC - QE)/\{QC - (QE + QA)\}$$

This equation clearly shows a fact that the coefficient of the performance of the air conditioner is larger than 1. Accordingly, it is possible to reduce the input to the compressor 31, and therefore it is possible to largely reduce the energy consumption of the air conditioner. Therefore, it becomes possible to largely improve the limit running distance of an electric vehicle if it is applied to the electric vehicle.

In the first embodiment of the air conditioner according to the present invention, the outer heat exchanger 38 is operated so as to radiate the heat into the ambient air, to absorb the heat from the ambient air, or to shut the communication between the ambient air and the refrigerant in reply to the need to the system. That is, under an intensely cold condition the outer heat exchanger 38 is not used so as to shut the communication between the ambient air and the refrigerant, and under a slightly cold condition it functions to absorb heat from the ambient air. Further, under a hot condition it functions to radiate the heat of the refrigerant into the ambient air. Accordingly, this air conditioner functions such that the heating operation is implemented in wide-range cold circumstances from an intensely cold condition to a slightly cold condition. Furthermore, this air conditioner operates such that a coefficient of its performance is larger than 1 under a slightly cold condition. This enables the air conditioner to reduce its energy consumption.

Figure 6:
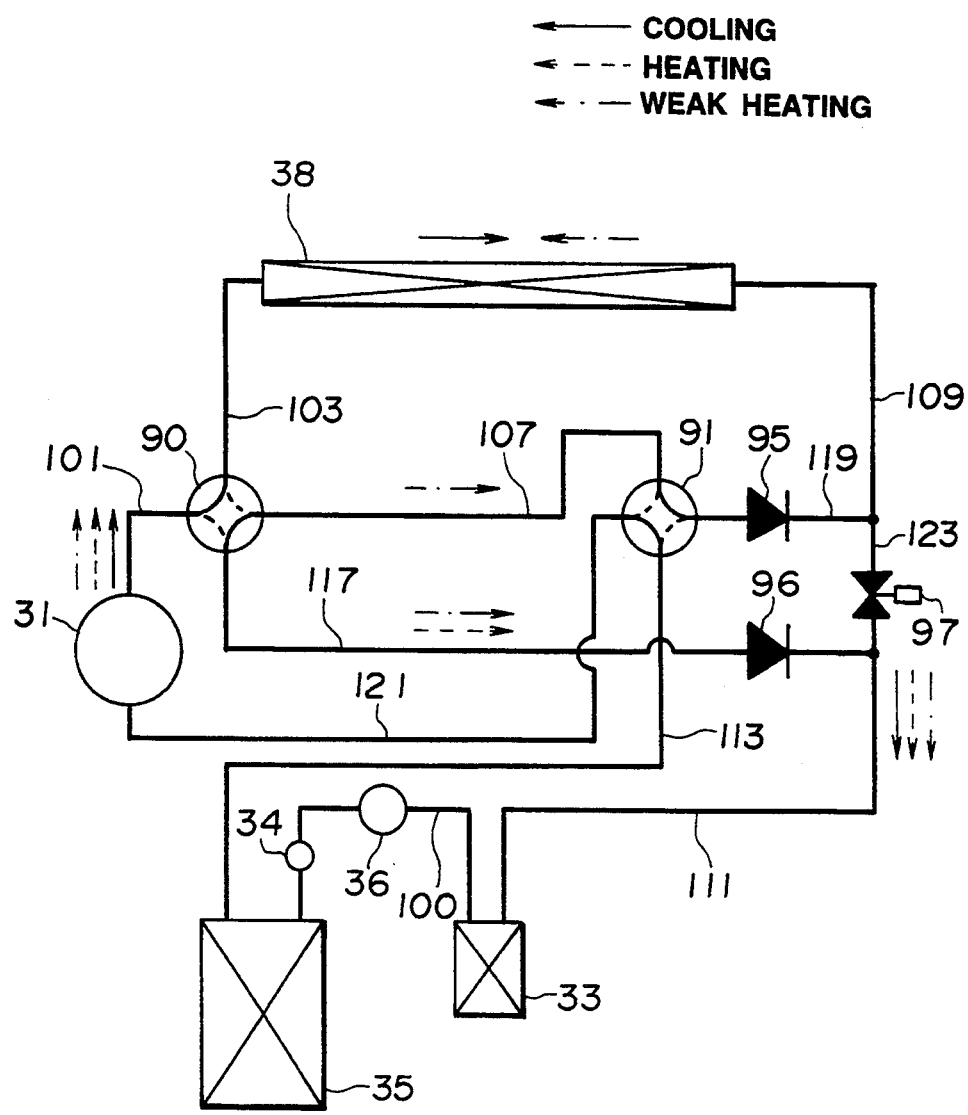
FIG. 6 is a view which shows a refrigerant flow during each operation mode in a second embodiment of the air conditioner according to the present invention.

Referring to FIGS. 6 and 7, there is shown a second embodiment of the air conditioner for a vehicle according to the present invention.

In the second embodiment, the refrigerant passage switching means is constituted by the first and second valves 90 and 91 and a refrigerant flow control valve 97.

The first four-way valve 90 is connected to the refrigerant discharge side of the compressor 31 and the refrigerant inlet side of the outer heat exchanger 38 through the conduits 101 and 103, respectively. Further, the first four-way valve 90 is connected to the second four-way valve 91 and the conduit 111 through conduits 107 and 117, respectively.

The second four-way valve 91 is connected to the first four-way valve 90 and the conduit 109 through the conduits 107 and 119, receptively. Further, the second four-way valve 91 is connected to the refrigerant outlet side of the heat-absorbing inner heat exchanger 35 and the refrigerant suction side of the compressor 31 through conduits 113 and 121, respectively. The refrigerant control valve 97 is disposed in a conduit 123 which communicates the conduits 109 and 111. One-way valves 95 and 96 are disposed in conduits 119 and 117, respectively.

The operating condition of the valves and the heat exchangers according to the selected operation mode in the second embodiment is represented by a table of FIG. 7. Accordingly, during the cooling operation, the operating condition of them is set such that the refrigerant is circulated as follows: The compressor 31→the conduit 101→the four-way valve 90→the conduit 103→the outer heat exchanger 38→the conduit 109→the refrigerant control valve 97 in the conduit 123→the conduit 111→the heat-radiating inner heat exchanger 33→the receiver 36 and the expansion valve 34 in the conduit 100→the heat-absorbing inner heat exchanger 35→the conduit 113→the second four-way valve 91→the conduit 121→the compressor 31. Therefore, the heat of the refrigerant in the air conditioner is radiated through the outer heat exchanger 38 and the heat-radiating inner heat exchanger 35, and the heat of the air flowing the duct 39 is absorbed into the refrigerant through the heat-absorbing inner heat exchanger 35.

During the heating operation, the refrigerant is circulated as follows: The compressor 31→the conduit 101→the first four-way valve 90→the conduit 117→the conduit 111→the heat-radiating inner heat exchanger 33→the receiver 36 and the expansion valve 34 of the conduit 100→the heat-absorbing inner heat exchanger 35→the conduit 113→the second four-way valve 91→the conduit 121→the compressor 31. Accordingly, the outer heat exchanger 38 is not used, the heat-radiating inner heat exchanger 33 is operated to radiate the heat of the refrigerant, and the heat-absorbing inner heat exchanger 35 is operated to absorb the heat into the refrigerant.

During the weak heating operation, the refrigerant is circulated as follows: The compressor 31→the conduit 101→the first four-way valve 90→the conduit 117→the conduit 111→the heat-radiating inner heat exchanger 33→the receiver 36 and the expansion valve 34 in the conduit 100→the heat-absorbing inner heat exchanger 35→the conduit 113→the second four-way valve 91→the conduit 119→the conduit 109→the outer heat exchanger 38→the conduit 103→the first four-way valve 90→the conduit 107→the second four-way valve 91→the conduit 121→the compressor 31. Accordingly, the heat-radiating inner heat exchanger 33 warms the air flowing through it, and the heat-absorbing inner heat exchanger 35 generates cools the air flowing through it. Further, the outer heat exchanger 38 absorbs heat from the ambient air.

The second embodiment of the air conditioner according to the present invention gains functional effects as mentioned in the first embodiment. Furthermore, since the second embodiment is arranged to implement the cooling operation, the heating operation and the weak heating operation only by using two four-way valves 90 and 91, and the refrigerant control valve 97, the control of this system is simple and the production cost thereof is reduced.

Figure 8:
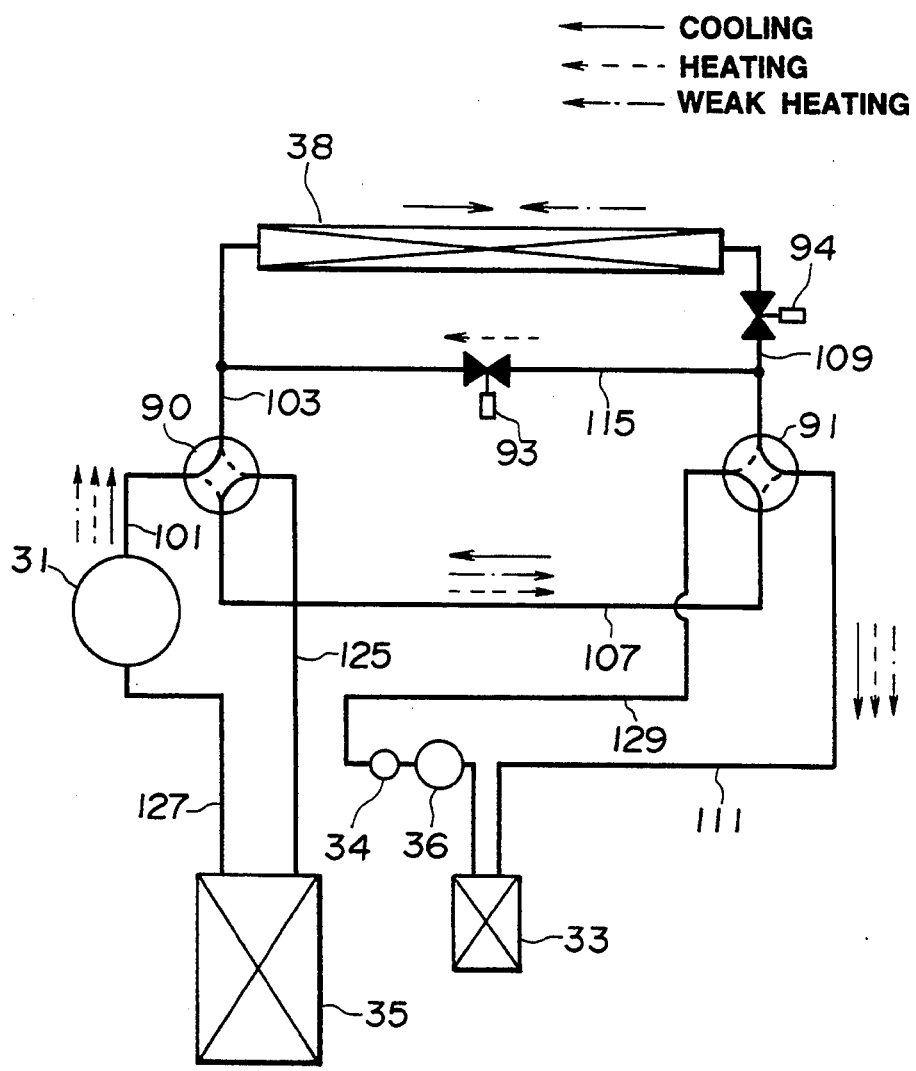
FIG. 8 is a view which shows refrigerant flow during each mode in a third embodiment of the air conditioner according to the present invention.

Referring to FIGS. 8 and 9, there is shown a third embodiment of the air conditioner for a vehicle according to the present invention.

In the third embodiment, the first and second four-way valves 90 and 91, and a bypass valve constituted by the second and third switching valves 93 and 94 are used as a refrigerant passage switching means.

The first four-way valve 90 is connected to the refrigerant discharge side of the compressor 31 and the refrigerant inlet side of the outer heat exchanger 38 through the conduits 101 and 103, respectively. Further, the first four-way valve 90 is connected to the second four-way valve 91 and the refrigerant inlet side of the heat-absorbing inner heat exchanger 35 through conduits 107 and 125, respectively. The refrigerant outlet side of the heat-absorbing inner heat exchanger 35 is connected to the refrigerant suction side of the compressor 31 through a conduit 127.

The second four-way valve 91 is connected to the first four-way valve 90 and the refrigerant outlet side of the outer heat exchanger 38 through the conduit 107 and 109, respectively. Further, the second four-way valve 91 is connected to the refrigerant inlet side of the heat-radiating inner heat exchanger 33 and the refrigerant outlet side of the heat-radiating inner heat exchanger 33 through conduits 111 and 129, respectively. The expansion valve 34 and the receiver 36 are disposed in the conduit 129.

The second switching valve 93 is disposed the conduit 115 which connects the conduit 103 and the conduit 109 so as to bypass the outer heat exchanger 38. The third switching valve 94 is disposed in the way of the conduit 109 so as to be located at a position between the refrigerant outlet side of the outer heat exchanger 38 and a conjunction of the conduit 115.

The operating condition of the valves and the heat exchangers according to the selected operation mode in the third embodiment is represented by a table of FIG. 9. Accordingly, during the cooling operation, the operating condition of them is set such that the refrigerant is circulated as follows: The compressor 31→the conduit 101→the first four-way valve 90→the conduit 103→the outer heat exchanger 38→the third switching valve 94 in the conduit 109→the second four-way valve 91→the conduit 111→the heat-radiating inner heat exchanger 33→the receiver 36 and the expansion valve 34 in the conduit 129→the second four-way valve 91→the conduit 107→the first four-way valve 90→the conduit 125→the heat-absorbing inner heat exchanger 35→the conduit 127→the compressor 31. Therefore, the heat of the refrigerant is radiated into the ambient air through the outer heat exchanger 38, and warmed air is generated by the heat-radiating inner heat exchanger 33. Further, cool air is generated by the heat-absorbing inner heat exchanger 35.

During the heating operation, the refrigerant is circulated as follows: The compressor 31→the conduit 101→the first four-way valve 90→the conduit 107→the second four-way valve 91→the conduit 111→the heat-radiating inner heat exchanger 33→receiver 36 and the expansion valve 34 in the conduit 129→the second four-way valve 91→the second switching valve 93 in the conduit 115→the conduit 103→the first four-way valve 90→the conduit 125→the heat-absorbing inner heat exchanger 35→the conduit 127→the compressor 31. Accordingly, the outer heat exchanger 38 is not used, and the air for air conditioning is warmed at the heat-radiating inner heat exchanger 33. Further, the air for air conditioning is cooled at the heat-absorbing inner heat exchanger 35.

During the weak heating operation, the refrigerant is circulated as follows: The compressor 31→the conduit 101→the first four-way valve 90→the conduit 107→the second four-way valve 91→the conduit 111→the heat-radiating inner heat exchanger 33→the receiver 36 and the expansion valve 34 in the conduit 129→the second four-way valve 91→the third switching valve 94 in the conduit 109→the outer heat exchanger 38→the conduit 103→the first four-way valve 90→the conduit 125→the heat-absorbing inner heat exchanger 35→the conduit 127→the compressor 31. Accordingly, the air for the air conditioning is warmed at the heat-radiating inner heat exchanger 33 and is cooled at the heat-absorbing inner heat exchanger 35. Further, the outer heat exchanger 38 functions to absorb the heat from the ambient air.

The third embodiment of the air conditioner according to the present invention gains functional effects as is similar to that of the first embodiment. Furthermore, the third embodiment is arranged to implement the cooling operation, the heating operation and the weak heating operation only by using two four-way valves 90 and 91, and the two switching valves 93 and 94. Additionally, since during the weak heating operation the refrigerant is flowed into the outer heat exchanger 38 before the heat-absorbing inner heat exchanger 35, it is possible to arrange such that the heat-absorbing amount of the outer heat exchanger 38 is larger than that of the heat-absorbing inner heat exchanger 35 when the air conditioner of the third embodiment is used under a slight cold condition.

Figure 10:
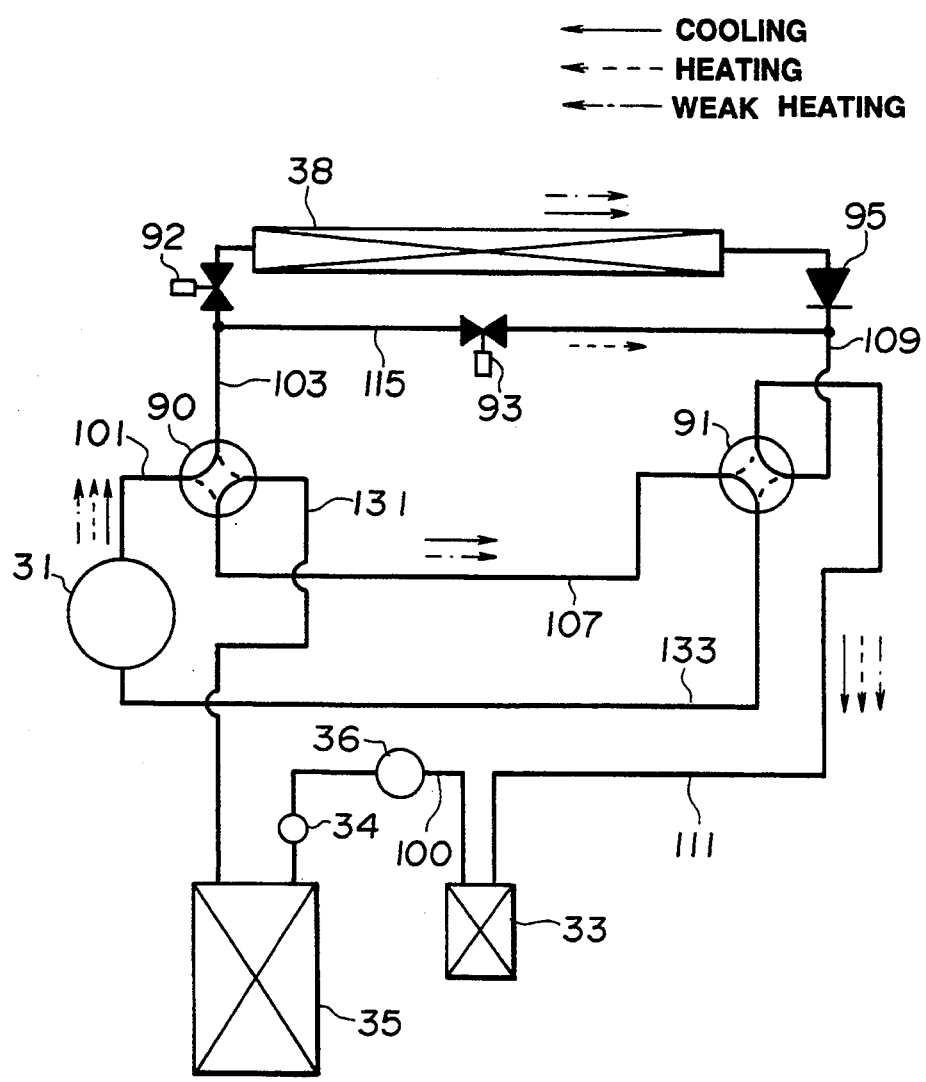
FIG. 10 is a view which shows refrigerant flow during each mode in a fourth embodiment of the air conditioner according to the present invention.

Referring to FIGS. 10 and 11, there is shown a fourth embodiment of the air conditioner for a vehicle according to the present invention.

In this embodiment, a refrigerant passage switching means is constituted by the first and second four-way valves 90 and 91, and a bypass valve which is constituted by the first and second switching valves 92 and 93.

The first four-way valve 90 is connected to the refrigerant discharge side of the compressor 31 and the refrigerant inlet side of the outer heat exchanger 38 through the conduit 101 and 103, respectively. Further, the first four-way valve 90 is connected to the second four-way valve 91 and the refrigerant outlet side of the heat-absorbing inner heat exchanger 35 through conduits 107 and 131.

The second four-way valve 91 is connected to the first four-way valve 90 and the refrigerant outlet side of the outer heat exchanger 38 through the conduits 107 and 109, respectively. Further, the second four-way valve 90 is connected to the refrigerant inlet side of the heat-radiating inner heat exchanger 33 and the refrigerant suction side of the compressor 31 through conduits 111 and 133, respectively.

A one-way valve 95 is disposed in the conduit 109 so as to be located between the refrigerant outlet side of the outer heat exchanger 38 and the conjunction of the conduits 109 and 115. The one-way valve 95 functions to allow refrigerant to flow from the outer heat exchanger 38 to the second four-way valve 91 and to prevent the refrigerant from flowing from the second four-way valve 91 to the outer heat exchanger 38.

The operating condition of the valves and the heat exchangers according to the selected operation mode in the second embodiment is represented by a table of FIG. 11. Accordingly, during the cooling operation, the refrigerant is circulated as follows: The compressor 31→the conduit 101→the first four-way valve 90→the first switching valve 92 in the conduit 103→the outer heat exchanger 38→the one-way valve 95 in the conduit 109→the second four-way valve 91→the conduit 111→the heat-radiating inner heat exchanger 33→the receiver 36 and the expansion valve 34 in the conduit 100→the heat-absorbing inner heat exchanger 35→the conduit 131→the first four-way valve 90→the conduit 107→the second four-way valve 91→the conduit 133→the compressor 31. Therefore, the heat of the refrigerant is radiated at the outer heat exchanger 38 into the ambient air, the air for air conditioning is warmed at the heat-radiating inner heat exchanger 33, and the air for air-conditioning is cools at the heat-absorbing inner heat exchanger 35.

During the heating operation, the refrigerant is circulated as follows: The compressor 31→the conduit 101→the first four-way valve 90→the conduit 103→the second switching valve 93 in the conduit 115→the conduit 109→the second four-way valve 91→the conduit 111→the heat-radiating inner heat exchanger 33→the receiver 36 and the expansion valve 34 in the conduit 100→the heat-absorbing inner heat exchanger 35→the conduit 131→the first four-way valve 90→the conduit 107→the second four-way valve 91→the conduit 133→the compressor 31. Accordingly, the outer heat exchanger 38 is not used, and the air for air conditioning is warmed at the heat-radiating inner heat exchanger 33. Further, the air for air-conditioning is cooled at the heat-absorbing inner heat exchanger 35.

During the weak heating operation, the refrigerant is circulated as follows: The compressor 31→the conduit 101→the first four-way valve 90→the conduit 107→the second four-way valve 91→the conduit 111→the heat-radiating inner heat exchanger 33→the receiver 36 and the expansion valve 34 in the conduit 100→the heat-absorbing inner heat exchanger 35→the conduit 131→the first four-way valve 90→the first switching valve 92 in the conduit 103→the outer heat exchanger 38→the one-way valve 95 in the conduit 109→the second four-way valve 91→the conduit 133→the compressor 31. Accordingly, the air for air-conditioning is warmed at the heat-radiating inner heat exchanger 33, and the air for air-conditioning is cooled at the heat-absorbing inner heat exchanger 35. Further, the outer heat exchanger 38 absorbs the heat of the ambient air.

Figure 12:
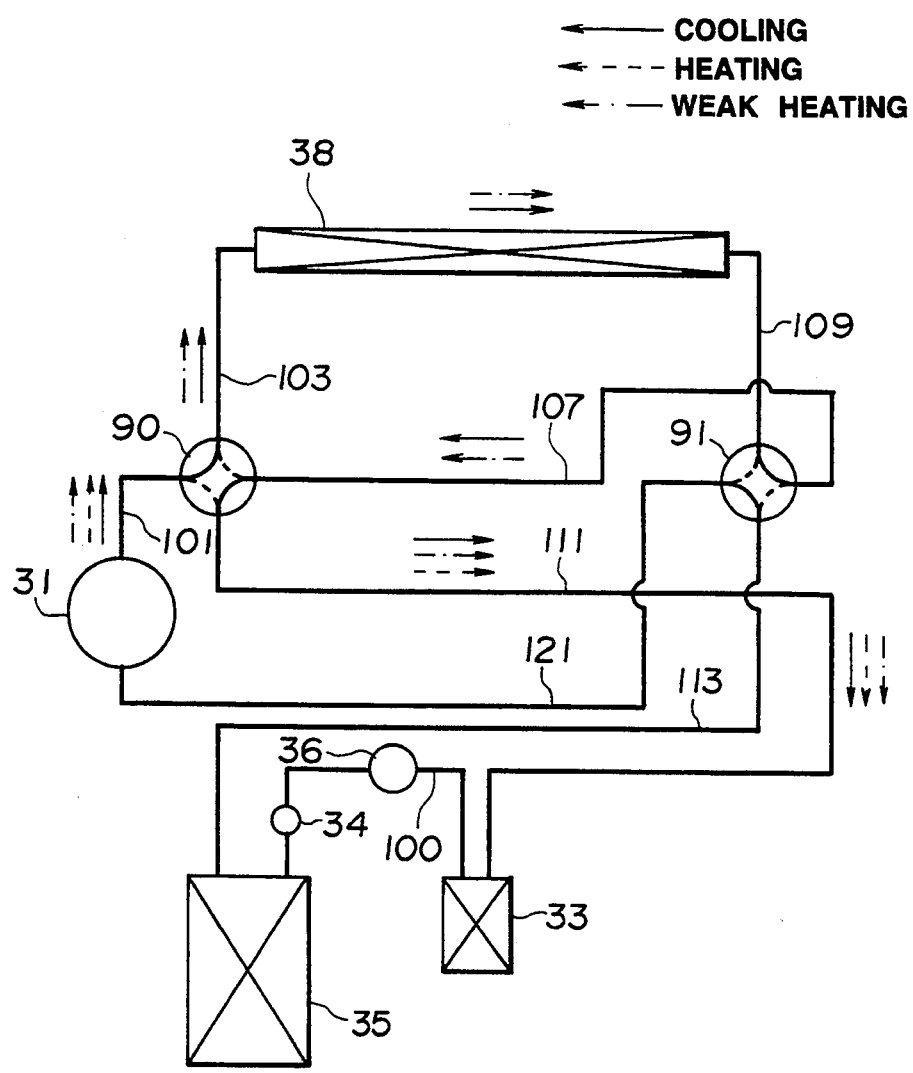
FIG. 12 is a view which shows refrigerant flow during each mode in a fifth embodiment of the air conditioner according to the present invention.

Referring to FIGS. 12 and 13, there is shown a fifth embodiment of the air conditioner according to the present invention.

In this embodiment, the first and second four-way valves 90 and 91 function as a refrigerant passage switching means.

The first four-way valve 90 is connected to the refrigerant discharge side of the compressor 31 and the refrigerant inlet side of the outer heat exchanger 38 through the conduits 101 and 103, respectively. Further, the first four-way valve 90 is connected to the second four-way valve 91 and the refrigerant inlet side of the heat-radiating inner heat exchanger 33 through the conduits 107 and 111, respectively.

The second four-way valve is connected to the first four-way valve 90 and the refrigerant outlet side of the outer heat exchanger 38 through the conduits 107 and 109. Further, the second four-way valve 91 is connected to the refrigerant outlet side of the heat-absorbing inner heat exchanger 35 and the refrigerant suction side of the compressor 31 through the conduits 113 and 121, respectively.

The operating condition of the valves and the heat exchangers according to the selected operation mode in the second embodiment is represented by a table of FIG. 13. That is, during the cooling operation, the refrigerant is circulated as follows: The compressor 31→the conduit 101→the first four-way valve 90→the conduit 103→the outer heat exchanger 38→the conduit 109→the second four-way valve 91→the conduit 107→the first four-way valve 90→the conduit 111→the heat-radiating inner heat exchanger 33→the receiver 36 an the expansion valve 34 in the conduit 100→the heat-absorbing inner heat exchanger 35→the conduit 113→the second four-way valve 91→the conduit 121→the compressor 31. Accordingly, the outer heat exchanger 38 radiates the heat of the refrigerant into the ambient air, and the air for air-conditioning is warmed at the heat-radiating inner heat exchanger 33. Further, the air for air-conditioning is cooled at the heat-absorbing inner heat exchanger 35.

During the heating operation, the refrigerant is circulated as follows: The compressor 31→the conduit 101→the first four-way valve 90→the conduit 111→the heat-radiating inner heat exchanger 33→the receiver 36 and the expansion valve 34 in the conduit 100→the heat-absorbing inner heat exchanger 35→the conduit 113→the second four-way valve 91→the conduit 121→the compressor 31. Accordingly, the outer heat exchanger 38 is not used, and the air for air-conditioning is warmed at the heat-radiating inner heat exchanger 33. Further, the air for air conditioning is cooled at the heat-absorbing inner heat exchanger 35.

During the weak heating operation, the refrigerant is circulated as follows: The compressor 31→the conduit 101→the first four-way valve 90→the conduit 111→the heat-radiating inner heat exchanger 33→the receiver 36 and the expansion valve 34 in the conduit 100→the heat-absorbing inner heat exchanger 35→the conduit 113→the second four-way valve 91→the conduit 107→the first four-way valve 90→the conduit 103→the outer heat exchanger 38→the conduit 109→the second four-way valve 91→the conduit 121→the compressor 31. Accordingly, the air for air-conditioning is warmed at the heat-radiating inner heat exchanger 33, and the air for air-conditioning is cooled at the heat-absorbing inner heat exchanger 35. Further, the outer heat exchanger 38 functions to absorb heat from the ambient air.

The fifth embodiment of the air conditioner according to the present invention gains functional effects as mentioned in the first embodiment. Furthermore, the fifth embodiment is arranged to implement the cooling operation, the heating operation and the weak heating operation only by using two four-way valves 90 and 91. Additionally, since the flowing direction of the refrigerant is not changed between the cooling operation and the heating operation, it is not necessary to provide a passage for bypassing the outer heat exchanger 38.

Figure 14:
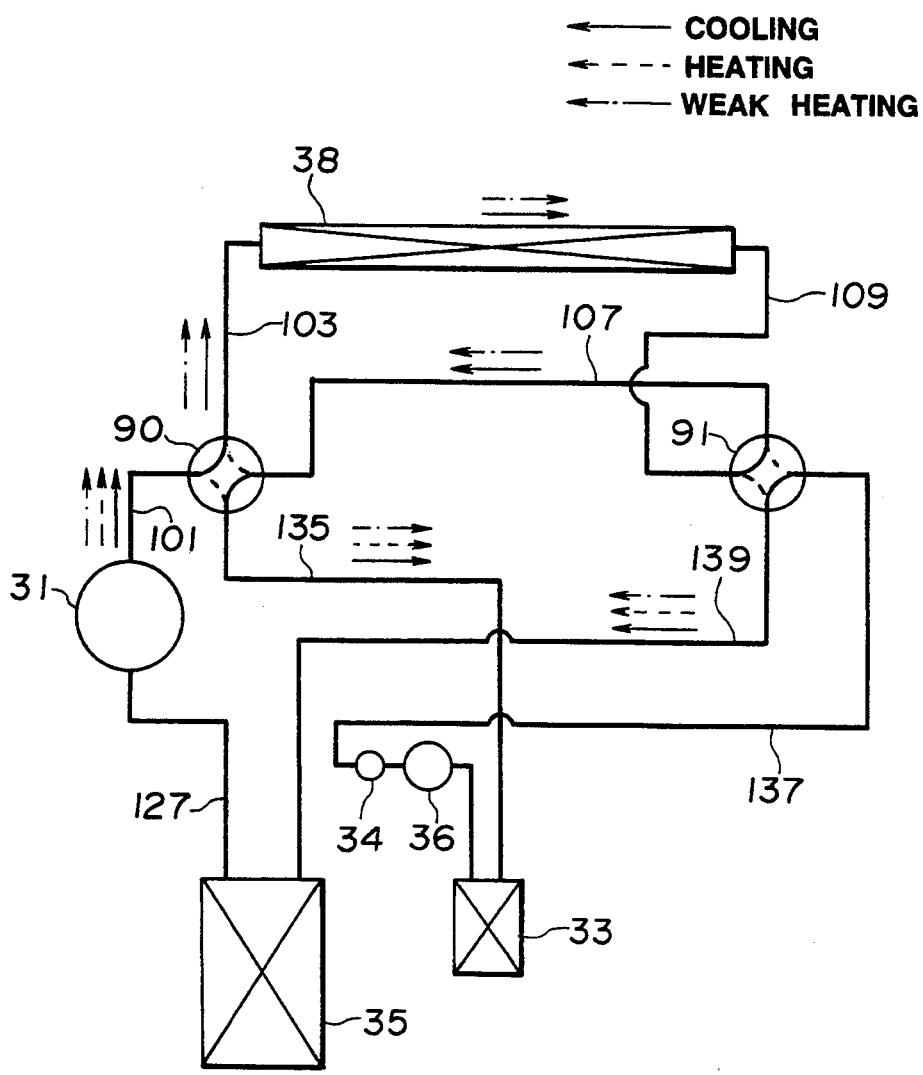
FIG. 14 is a view which shows refrigerant flow during each mode in a sixth embodiment of the air conditioner according to the present invention.

Referring to FIGS. 14 and 15, there is shown a sixth embodiment of the air conditioner according to the present invention.

In this embodiment, the first and second four-way valves 90 and 91 are used as a refrigerant passage switching means as is similar to the fifth embodiment.

The first four-way valve 90 is connected to the refrigerant discharge side of the compressor 31 and the refrigerant inlet side of the outer heat exchanger 38 through the conduit 101 and 103, respectively. Further, the first four-way valve 90 is connected to the second four-way valve 91 and the refrigerant inlet side of the heat-radiating inner heat exchanger 33 through conduits 107 and 135, respectively.

The second four-way valve 91 is connected to the first four-way valve 90 and the refrigerant outlet side of the outer heat exchanger 38 through the conduits 107 and 109, respectively. Further, the second four-way valve 91 is connected to the refrigerant outlet side of the heat-radiating inner heat exchanger 33 through the expansion valve 34 and the receiver 36, through conduits 137 and 139, respectively.

The operating condition of the valves and the heat exchangers according to the selected operation mode in the sixth embodiment is represented by a table of FIG. 15. During the cooling operation, the refrigerant is circulated as follows: The compressor 31→the conduit 101→the first four-way valve 90→the conduit 103→the outer heat exchanger 38→the conduit 109→the second four-way valve 91→the conduit 107→the first four-way valve 90→the conduit 135→the heat-radiating inner heat exchanger 33→the receiver 36 and the expansion valve 34 in the conduit 137→the second four-way valve 91→the conduit 139→the heat-absorbing inner heat exchanger 35→the conduit 127→the compressor 31. Accordingly, the outer heat exchanger 38 radiates the heat of the refrigerant in the ambient air, and the air for air conditioning is warmed at the heat-radiating inner heat exchanger 33. Further, the air for air-conditioning is cooled at the heat-absorbing inner heat exchanger 35.

During the heating operation, the refrigerant is circulated as follows: The compressor 31→the conduit 101→the first four-way valve 90→the conduit 135→the heat-radiating inner heat exchanger 33→the receiver 36 and the expansion valve 34 in the conduit 137→the second four-way valve 91→the conduit 139→the heat-absorbing inner heat exchanger 35→the conduit 127→the compressor 31. Accordingly, the outer heat exchanger 38 is not used, and the air for air conditioning is warmed at the heat-radiating inner heat exchanger 33. Further, the air for air-conditioning is cooled at the heat-absorbing inner heat exchanger 35.

During the weak heating operation, the refrigerant is circulated as follows: The compressor 31→the conduit 101→the first four-way valve 90→the conduit 135→the heat-radiating inner heat exchanger 33→the receiver 36 and the expansion valve 34 in the conduit 137→the second four-way valve 91→the conduit 107→the first four-way valve 90→the conduit 103→the outer heat exchanger 38→the conduit 109→the second four-way valve 91→the conduit 139→the heat-absorbing inner heat exchanger 35→the conduit 127→the compressor 31. Accordingly, the air for air conditioning is warmed at the heat-radiating inner heat exchanger 33, and the air for air-conditioning is cooled at the heat-absorbing inner heat exchanger 35. Further, the outer heat exchanger 38 functions to absorb heat from the ambient air.

The sixth embodiment of the air conditioner according to the present invention gains functional effects as mentioned in the fifth embodiment. Furthermore, since during the weak heating operation the refrigerant is flowed into the outer heat exchanger 38 before the heat-absorbing inner heat exchanger 35, it is possible to arrange such that the heat-absorbing amount of the outer heat exchanger 38 is larger than that of the heat-absorbing inner heat exchanger 35. Therefore it becomes possible to increase the absorbing heating amount from the ambient air.

Figure 16:
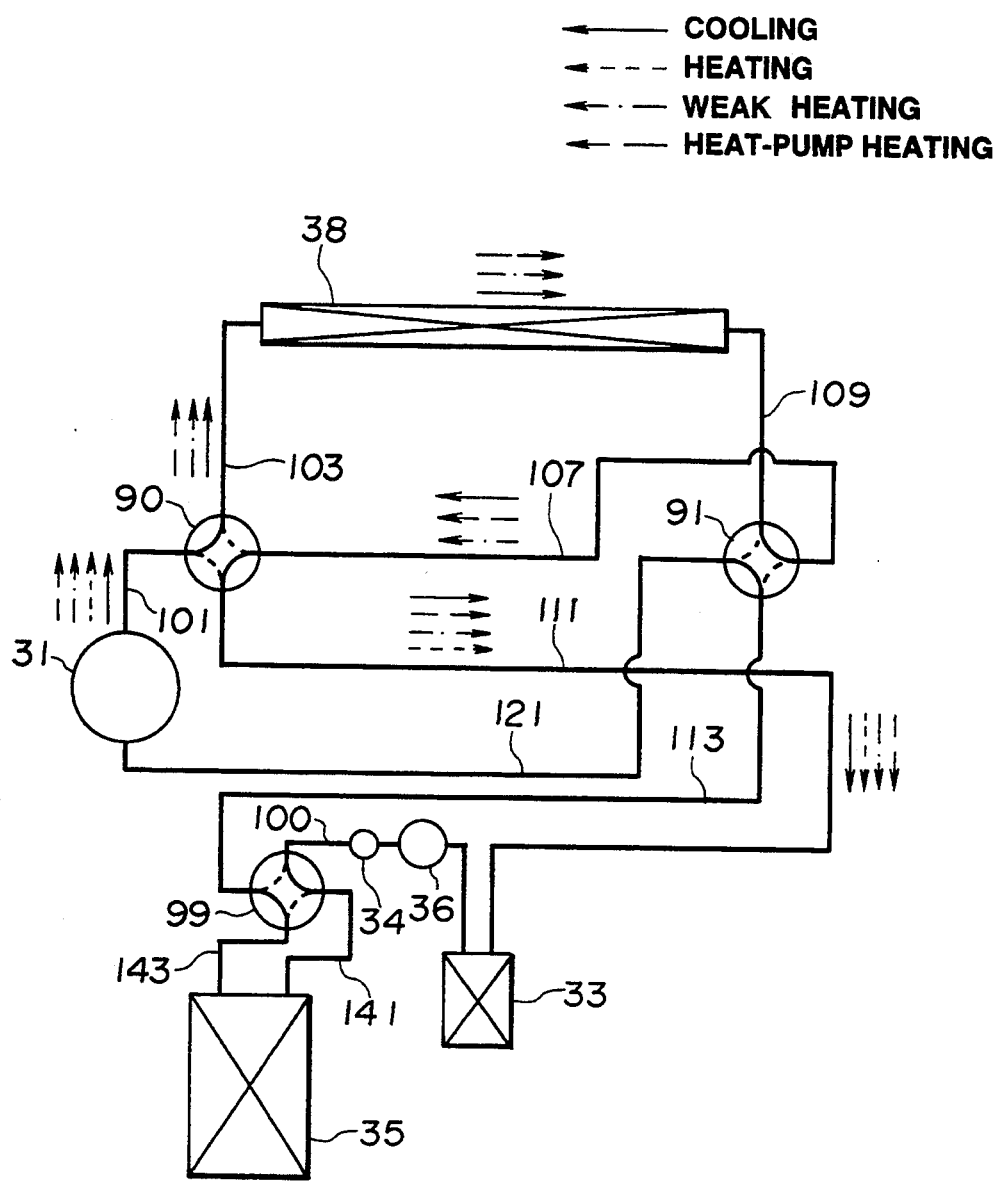
FIG. 16 is a view which shows refrigerant flow during each mode in a seventh embodiment of the air conditioner according to the present invention.
Figure 17:
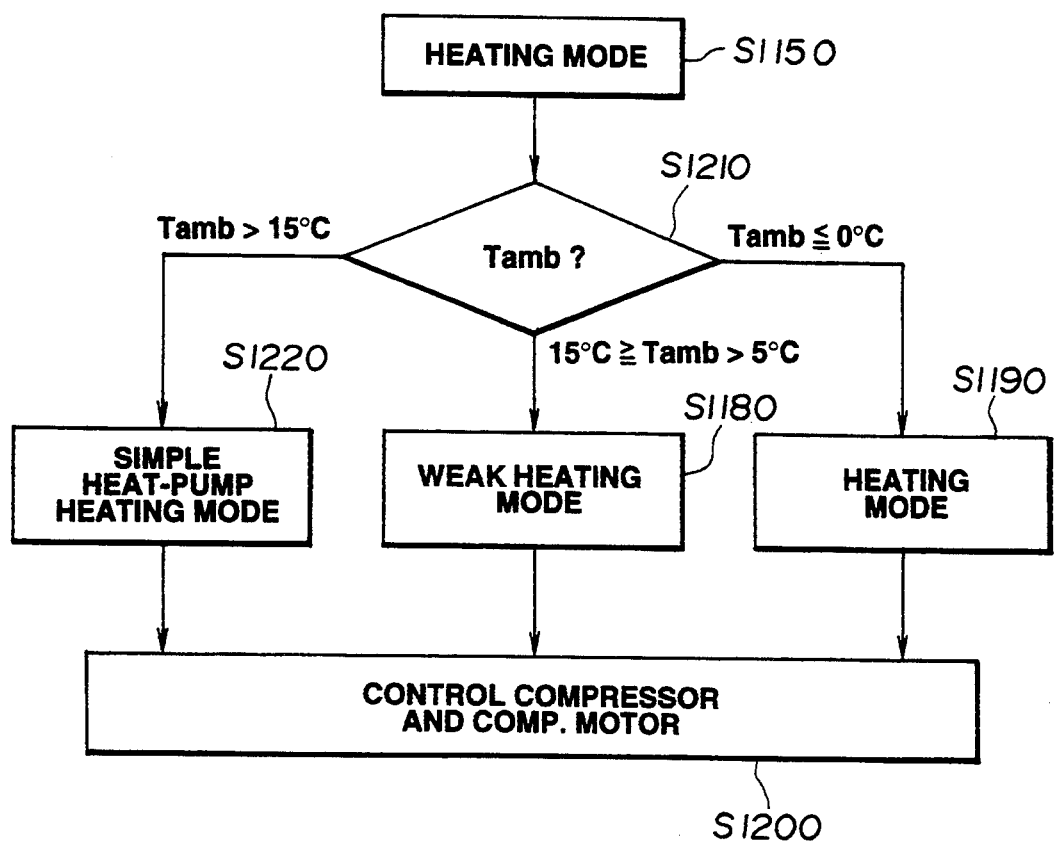
FIG. 17 is a part of a flow chart which is applied to the control of the seventh embodiment of FIG. 16.

Referring to FIGS. 16 to 18, there is shown a seventh embodiment of the air conditioner according to the present invention.

In this embodiment, a third four-way valve 99 is used in addition to the first and second four-way valves 90 and 91 as a refrigerant passage switching means.

The connecting condition of the first and second four-way valves 90 and 91 is generally the same as that of the fifth embodiment shown in FIG. 12. In addition, in this seventh embodiment, the third four-way valve 99 is connected to the conduits 100 and 113, and conduits 141 and 143 which are connected to the refrigerant inlet side and the refrigerant outlet side of the heat-absorbing inner heat exchanger 35, respectively.

The control of the seventh embodiment is basically the same as that of the first embodiment except that a part of the flow chart shown in FIG. 17 is used instead of the steps S1150, S1170, S1180, S1190 and S1200. That is, the program of the seventh embodiment is arranged such that in a step S1210 shown in FIG. 17 it is judged which heating mode of the weak heating mode, the heating mode, simple heat-pump heating mode is selected, and that in a step 1220 the simple heat-pump heating mode is implemented.

More particularly, in the step S1210 it is judged whether the ambient air temperature is lower than 5° C., is between 5° C. and 15° C., or is higher than 15° C. When $T_{amb} \leqq 5°$ C., the program proceeds to the step 1190 wherein the heating mode is selected. When 15° $C. \geqq T_{amb} > 5°$ C., the program proceeds to the step S1180 wherein the weak heating mode is selected. When $T_{amb} > 15°$ C., the program proceeds to the step S1220 wherein the simple heating mode is selected. After the implement of each of the steps S1180, S1190 and S1220, the program proceeds to a step S1200 wherein the control of the compressor 31 and the compressor motor is implemented according to the selected operation mode.

With this control of the seventh embodiment, the first, second and third four-way valves 90, 91 and 99 are controlled as shown in FIG. 18, and the heat exchangers 33, 35 and 38 function as shown in a table of FIG. 18 in each operation mode. That is, during the cooling operation, the refrigerant is circulated as follows: The compressor 31→the conduit 101→the first four-way valve 90→the conduit 103→the outer heat exchanger 38→the conduit 109→the second four-way valve 91→the conduit 107→the first four-way valve 90→the conduit 111→the heat-radiating inner heat exchanger 33→the receiver 36 and the expansion valve 34 in the conduit 100→the third four-way valve 99→the conduit 141→the heat absorbing inner heat exchanger 35→the conduit 143→the third four-way valve 99→the conduit 113→the second four-way valve 91→the conduit 121→the compressor 31. Accordingly, the outer heat exchanger 38 functions to radiate the heat of the refrigerant into the ambient air, the air for air conditioning is warmed at the heat-radiating inner heat exchanger 33, and the air for air-conditioning is cooled at the heat-absorbing inner heat exchanger 35.

During the heating operation, the refrigerant is circulated as follows: The compressor 31→the conduit 101→the first four-way valve 90→the conduit 111→the heat-radiating inner heat exchanger 33→the receiver 36 and the expansion valve 34 in the conduit 100→the their four-way valve 99→the conduit 141→the heat-absorbing inner heat exchanger 35→the conduit 143→the third four-way valve 99→the conduit 113→the second four-way valve 91→the conduit 121→the compressor 31. Accordingly, the outer heat exchanger 38 is not used, and the air for air-conditioning is warmed at the heat-radiating inner heat exchanger 33. Further, the air for air-conditioning is cooled at the heat-absorbing inner heat exchanger 35.

During the weak heating operation, the refrigerant is circulated as follows: The compressor 31→the conduit 101→the first four-way valve 90→the conduit 111→the heat-radiating inner heat exchanger 33→the receiver 36 and the expansion valve 34 in the conduit 100→the third four-way valve 99→the conduit 141→the heat-absorbing inner heat exchanger 35→the conduit 143→the third four-way valve 99→the conduit 113→the second four-way valve 91→the conduit 107→the first four-way valve 90→the conduit 103→the outer heat exchanger 38→the conduit 109→the second four-way valve 91→the conduit 121→the compressor 31. Accordingly, the air for air-conditioning is warmed at the heat-radiating inner heat exchanger 33, and the air for air-conditioning is cooled at the heat-absorbing inner heat exchanger 35. Further, the outer heat exchanger 38 functions to absorb heat from the ambient air.

Furthermore, during a simple heat-pump heating operation, the refrigerant is circulated as follows: The compressor 31→the conduit 101→the first four-way valve 90→the conduit 111→the heat-radiating inner heat exchanger 33→the receiver 36 and the expansion valve 34 in the conduit 100→the third four-way valve 99→the conduit 113→the second four-way valve 91→the conduit 107→the first four-way valve 90→the conduit 103→the outer heat exchanger 38→the conduit 109→the second four-way valve 91→the conduit 121→the compressor 31. Accordingly, the heat-absorbing inner heat exchanger 35 is not used, and the outer heat exchanger functions to absorb heat from the ambient air. Further, the air for air-conditioning is warmed at the heat-radiating inner heat exchanger 33.

The seventh embodiment of the air conditioner according to the present invention gains functional effects as mentioned in the fifth embodiment. Furthermore, the seventh embodiment is arranged to implement the simple heat-pump heating operation. Therefore, it becomes possible to properly select an operation mode from the heating, the weak heating and the simple heat-pump heating according to the factors for the control such as the ambient air temperature and the need of defogging operation.

Figure 19:
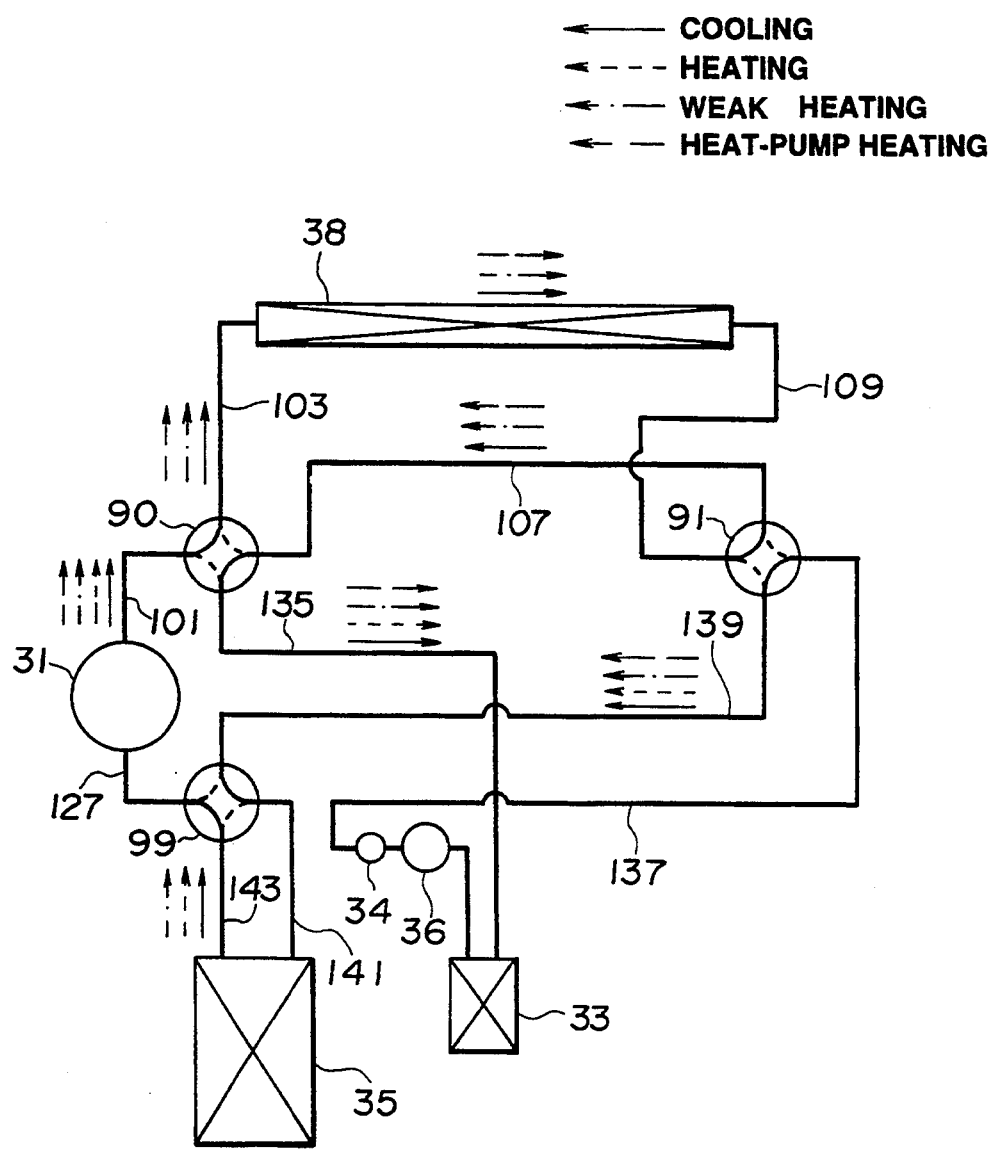
FIG. 19 is a view which shows refrigerant flow during each mode in an eighth embodiment of the air conditioner according to the present invention.
Figure 21:
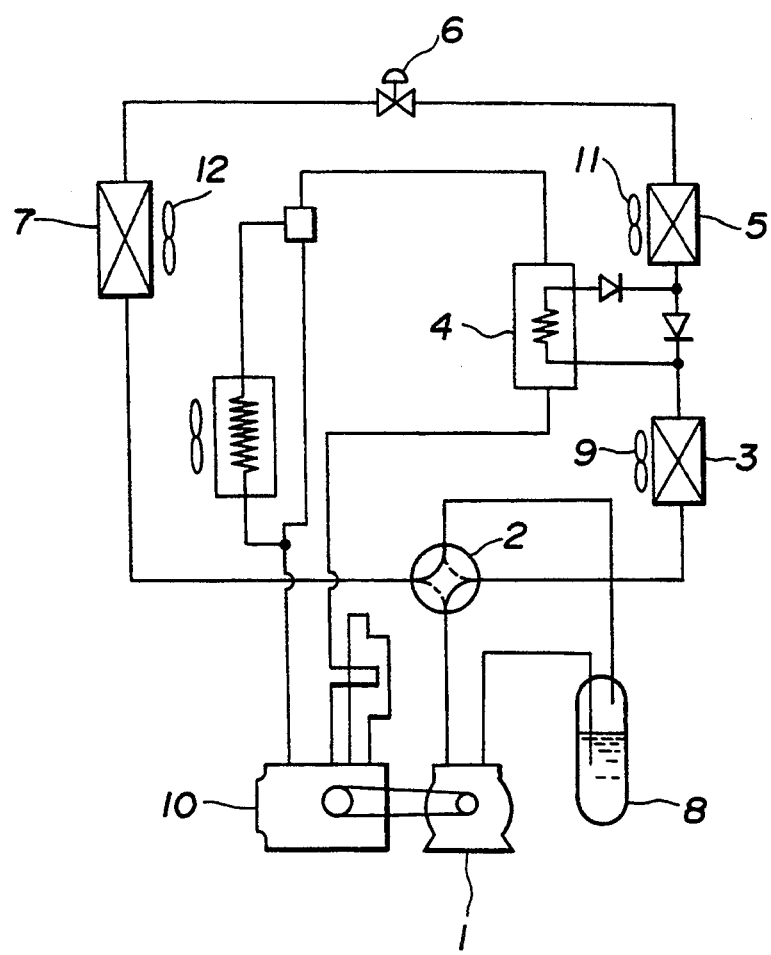
FIG. 21 is a schematic structural view of a conventional air conditioner for a vehicle.
Figure 22:
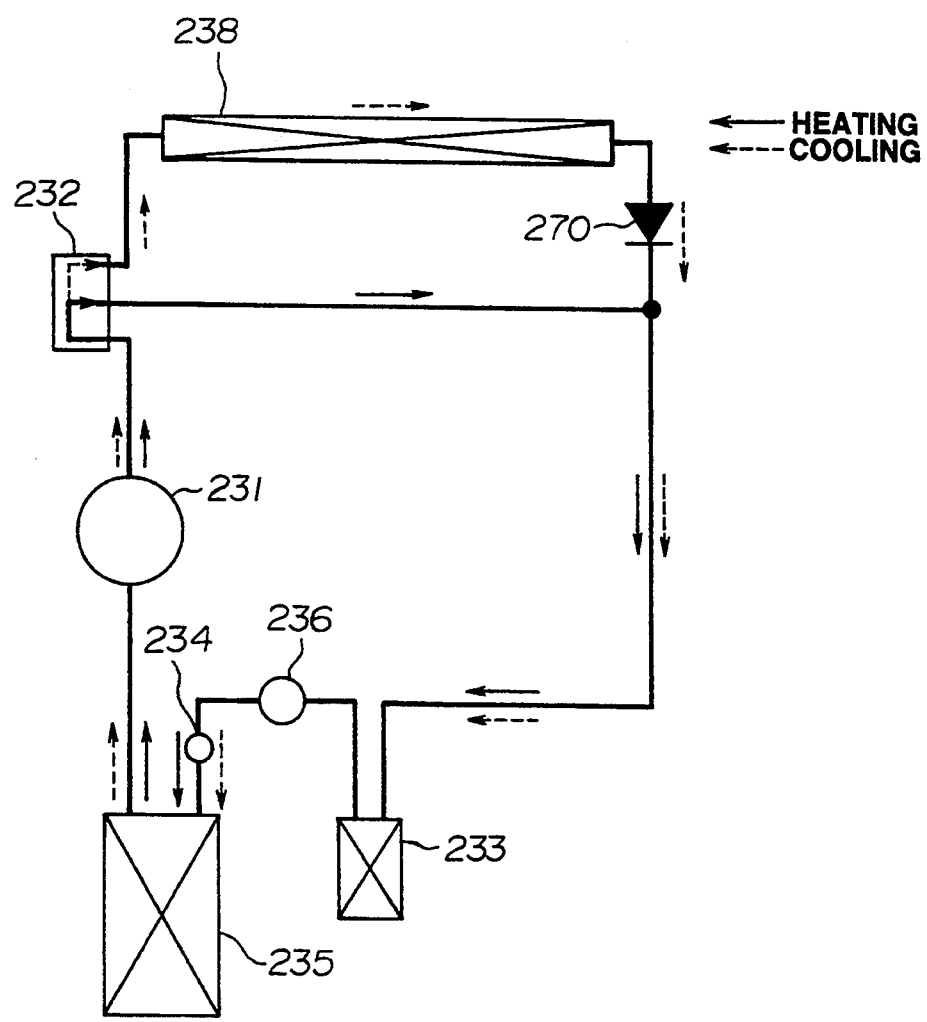
FIG. 22 is a view which shows refrigerant flow of another conventional air conditioner.

Referring to FIGS. 19 and 20, there is shown an eighth embodiment of the air conditioner according to the present invention.

In this embodiment, the first, second and third four-way valves 90, 91 and 99 are used as a refrigerant passage switching means.

The construction of this eighth embodiment is generally the same as that of the sixth embodiment except that the third four-way valve 99 is connected to the conduits 127 and the 139. Further, the third four-way valve 99 is connected to the refrigerant inlet side and outlet side of the heat-absorbing inner heat exchanger 35 through the conduits 141 and 143, respectively.

The operating condition of the valves and the heat exchangers according to the selected operation mode in the eighth embodiment is represented by a table of FIG. 20. Accordingly, during the cooling operation, the refrigerant is circulated as follows: The compressor 31→the conduit 101→the first four-way valve 90→the conduit 103→the outer heat exchanger 38→the conduit 109→the second four-way valve 91→the conduit 107→the first four-way valve 90→the conduit 135→the heat-radiating inner heat exchanger 33→the receiver 36 and the expansion valve 34 in the conduit 137→the second four-way valve 91→the conduit 139→the third four-way valve 99→the conduit 141→the heat-absorbing inner heat exchanger 35→the conduit 143→the third four-way valve 99→the conduit 127→the compressor 31. Therefore, the outer heat exchanger 38 functions to radiate the heat of the refrigerant into the ambient air, the air for air-conditioning is warmed at the heat-radiating inner heat exchanger 33, and the air for air-conditioning is cooled at the heat-absorbing inner heat exchanger 35.

During the heating operation, the refrigerant is circulated as follows: The compressor 31→the conduit 101→the first four-way valve 90→the conduit 135→the heat-radiating inner heat exchanger 33→the receiver 36 and the expansion valve 34 in the conduit 137→the second four-way valve 91→the conduit 139→the third four-way valve 99→the conduit 141→the heat-absorbing inner heat exchanger 35→the conduit 143→the third four-way valve 99→the conduit 127→the compressor 31. Accordingly, the outer heat exchanger 38 is not used, and the air for air-conditioning is warmed at the heat-radiating inner heat exchanger 33. Further, the air for air-conditioning is cooled at the heat-absorbing inner heat exchanger 35.

During the weak heating operation, the refrigerant is circulated as follows: the compressor 31→the conduit 101→the first four-way valve 90→the conduit 135→the heat-radiating inner heat exchanger 33→the receiver 36 and the expansion valve 34 in the conduit 137→the second four-way valve 91→the conduit 107→the first four-way valve 90→the conduit 103→the outer heat exchanger 38→the conduit 109→the second four-way valve 91→the conduit 139→the third four-way valve 99→the conduit 141→the heat-absorbing inner heat exchanger 35→the conduit 143→the third four-way valve 99→the conduit 127→the compressor 31. Accordingly, the air for air conditioning is warmed at the heat-radiating inner heat exchanger 33 and is cooled at the heat-absorbing inner heat exchanger 35. Further, the outer heat exchanger functions to absorb heat from the ambient air.

Furthermore, during the simple heat-pump heating operation, the refrigerant is circulated as follows: The compressor 31→the conduit 101→the first four-way valve 90→the heat-radiating inner heat exchanger 33→the receiver 36 and the expansion valve 34 in the conduit 137→the second four-way valve 91→the conduit 107→the first four-way valve 90→the conduit 103→the outer heat exchanger 38→the conduit 109→the second four-way valve 91→the conduit 139→the third four-way valve 99→the conduit 127→the compressor 31. Accordingly, the heat-absorbing inner heat exchanger 35 is not used, the outer heat exchanger 35 functions to absorb heat of the ambient air, and the air for air-conditioning is warmed at the heat-radiating inner heat exchanger 33.

The eighth embodiment of the air conditioner according to the present invention gains functional effects as mentioned in the sixth embodiment. Furthermore, the eighth embodiment is arranged to implement the simple heat-pump heating operation as is similar to the seventh embodiment. Therefore, it becomes possible to properly select an operation mode from the heating, the weak heating and the simple heat-pump heating according to the factors for the control such as the ambient air temperature and the need of defogging operation.

What is claimed is:

1. An air conditioner for a vehicle, comprising:
   refrigerant;
   a compressor applying a workload to said refrigerant;
   an outer heat exchanger transmitting heat between said refrigerant and ambient air;
   a blower leading air for air-conditioning a passenger compartment of the vehicle;
   a heat-radiating inner heat exchanger transmitting the heat of said refrigerant to the air led by said blower;
   an expansion valve adiabatically expanding said refrigerant;
   a heat-absorbing inner heat exchanger transmitting the heat of the air led by said blower to the refrigerant; and
   a refrigerant passage switching means set at one of a cooling mode, a heating mode and a weak heating mode,
      at the cooling mode said refrigerant flowing in the order of said compressor, said outer heat exchanger, said expansion valve, said heat-absorbing inner heat exchanger and said compressor,
      at the heating mode said refrigerant flowing in the order of said compressor, said heat-radiating inner heat exchanger, said expansion valve, said heat-absorbing inner heat exchanger and said compressor while bypassing said outer heat exchanger,
      at the weak heating mode said refrigerant flowing in the order of said compressor, said heat-radiating inner heat exchanger, said expansion valve, said outer heat exchanger and said compressor.

2. An air conditioner as claimed in claim 1, further comprising:
   an inner thermal condition detecting means for detecting a thermal condition of the passenger compartment;
   an inner thermal condition setting means for setting an aimed thermal condition of the passenger compartment by means of an setting operation by a driver of the vehicle;
   a compressor controlling means for controlling said compressor according to the output from said inner thermal condition detecting means and said inner thermal condition setting means; and
   a switch controlling means for controlling said refrigerant passage switching means according to the output from said inner thermal condition detecting means and said inner thermal condition setting means.

3. An air conditioner as claimed in claim 1, wherein said refrigerant passage switching means includes first and second four-way valves and a bypass means; the first four-way valve being connected to the refrigerant discharge side and the refrigerant suction side of said compressor, the refrigerant inlet side of said outer heat exchanger and the second four-way valve; the second four-way valve being connected to the first four-way valve, the refrigerant outlet side of said outer heat exchanger, the refrigerant inlet side of said heat-radiating inner heat exchanger and the refrigerant outlet side of said heat-absorbing inner heat exchanger; the bypass means being connected to the first four-way valve, the refrigerant inlet side of said outer heat exchanger and the second four-way valve.

4. An air conditioner as claimed in claim 1, wherein said refrigerant passage switching means includes first and second four-way valves and a refrigerant control means; the first four-way valve being connected to the refrigerant discharge side of said compressor, the refrigerant inlet side of said outer heat exchanger, the refrigerant inlet side of said heat-absorbing inner heat exchanger and the second four-way valve; the second four-way valve being connected to the first four-way valve, the refrigerant outlet side of said outer heat exchanger, the refrigerant outlet side of said heat-absorbing inner heat exchanger and the refrigerant suction side of said compressor; the refrigerant control valve being connected to the second four-way valve, the refrigerant outlet side of said outer heat exchanger, the first four-way valve and the refrigerant inlet side of said heat-radiating inner heat exchanger.

5. An air conditioner as claimed in claim 1, wherein said refrigerant passage switching means includes first and second four-way valves and a bypass valve; the first four-way valve being connected to the refrigerant discharge side of said compressor, the refrigerant inlet side of said outer heat exchanger, the second four-way valve and the refrigerant inlet side of said heat-absorbing inner heat exchanger; the second four-way valve being connected to the first four-way valve, the refrigerant outlet side of said outer heat exchanger, the refrigerant inlet side of said heat-radiating inner heat exchanger and the refrigerant outlet side of said expansion valve; the bypass valve being connected to the second four-way valve, the first four-way valve and the refrigerant outlet side of said outer heat exchanger.

6. An air conditioner as claimed in claim 1, wherein said refrigerant passage switching means includes first and second four-way valves and a refrigerant control valve; the first four-way valve being connected to the refrigerant discharge side of said compressor, the refrigerant inlet side of said outer heat exchanger, the second four-way valve and the refrigerant outlet side of said heat-absorbing inner heat exchanger; the second four-way valve being connected to the first four-way valve, the refrigerant outlet side of said outer heat exchanger, the refrigerant inlet side of said heat-radiating inner heat exchanger and the refrigerant suction side of said compressor; the refrigerant control valve being connected to the first four-way valve, the refrigerant inlet side of said outer heat exchanger and the second four-way valve.

7. An air conditioner as claimed in claim 1, wherein said refrigerant passage switching means includes first and second four-way valves, the first four-way valve being connected to the refrigerant discharge side of said compressor, the refrigerant inlet side of said outer heat exchanger, the second four-way valve and the refrigerant inlet side of said heat-radiating inner heat exchanger; the second four-way valve being connected to the first four-way valve, the refrigerant outlet side of said outer heat exchanger, the refrigerant outlet side of said heat-absorbing inner heat exchanger and the refrigerant suction side of said compressor.

8. An air conditioner as claimed in claim 1, wherein said refrigerant passage switching means includes first and second four-way valves; the first four-way valve being connected to the refrigerant discharge side of said compressor, the refrigerant inlet side of said outer heat exchanger, the second four-way valve and the refrigerant inlet side of said heat-radiating inner heat exchanger; the second four-way valve being connected to the first four-way valve, the refrigerant outlet side of said outer heat exchanger, the refrigerant outlet side of said heat-radiating inner heat exchanger and the refrigerant inlet side of said heat-absorbing inner heat exchanger.

9. An air conditioner as claimed in claim 1, wherein said refrigerant passage switching means includes first, second and third four-way valves; the first four-way valve being connected to the refrigerant discharge side of said compressor, the refrigerant outlet side of said outer heat exchanger, the second four-way valve and the refrigerant inlet side of said heat-radiating inner heat exchanger; the second four-way valve being connected to the first four-way valve, the refrigerant outlet side of said outer heat exchanger, the third four-way valve and the refrigerant suction side of said compressor; the third four-way valve being connected to the second four-way valve, the refrigerant outlet side of said expansion valve, the refrigerant inlet side and outlet side of said heat-absorbing inner heat exchanger.

10. An air conditioner as claimed in claim 1, wherein said refrigerant passage switching means includes first, second and third four-way valves; the first four-way valve being connected to the refrigerant discharge side of said compressor, the refrigerant outlet side of said outer heat exchanger, the second four-way valve and the refrigerant inlet side of said heat-radiating inner heat exchanger; the second four-way valve being connected to the first four-way valve, the refrigerant outlet side of said outer heat exchanger, the refrigerant outlet side of said heat-radiating inner heat exchanger and the third four-way valve; the third four-way valve being connected to the second four-way valve, the refrigerant inlet side and outlet side of said heat-absorbing inner heat exchanger and the refrigerant suction side of said compressor.

11. An air conditioner as claimed in claim 1, wherein when said refrigerant passage switching means is set at the cooling mode said refrigerant flows in the order of said compressor, said outer heat exchanger, said heat-radiating inner heat exchanger, said expansion valve, said heat-absorbing inner heat exchanger and said compressor.

12. An air conditioner as claimed in claim 1, wherein when said refrigerant passage switching means is set at the weak heating mode said refrigerant flows in the order of said compressor, said heat-radiating inner heat exchanger, said expansion valve, said heat-absorbing inner heat exchanger, said outer heat exchanger and said compressor.

13. An air conditioner as claimed in claim 1, wherein when said refrigerant passage switching means is set at the weak heating mode said refrigerant flows in the order of said compressor, said heat-radiating inner heat exchanger, said expansion valve, said outer heat exchanger, said heat-absorbing inner heat exchanger and said compressor.

14. An air conditioner as claimed in claim 1, wherein said refrigerant passage switching means switches a refrigerant flow among said compressor, said outer heat exchanger, said outer heat exchanger, said heat-radiating inner heat exchanger, said expansion valve and said heat-absorbing inner heat exchanger, said refrigerant passage switching means being set at the cooling mode when the air conditioner implements a cooling operation, said refrigerant passage switching means being set at the heating mode when the air conditioner implements a heating operation, said refrigerant passage switching means being set at the weak heating mode when the air conditioner implements a weak heating mode.

15. An air conditioner as claimed in claim 1, wherein said refrigerant passage switching means is set at one of the cooling mode, the heating mode, the weak heating mode and a simple heat-pump heating mode, during a simple heat-pump operation of the air conditioner said refrigerant passage switching means being set at the simple heat-pump heating mode in which said refrigerant flows in the order of said compressor, said heat-radiating inner heat exchanger, said expansion valve and said outer heat exchanger.

16. An air conditioner for a vehicle, comprising:
refrigerant;
a compressor applying a workload to said refrigerant;
an outer heat exchanger transmitting heat between said refrigerant and ambient air;
a blower leading air for air-conditioning a passenger compartment of the vehicle;
a heat-radiating inner heat exchanger transmitting the heat of said refrigerant to the air led by said blower;
an expansion valve adiabatically expanding said refrigerant;
a heat-absorbing inner heat exchanger transmitting the heat of the air led by said blower to the refrigerant;
an inner thermal condition detecting means for detecting a thermal condition of the passenger compartment;
an inner thermal condition setting means for setting an aimed thermal condition of the passenger compartment by means of an setting operation by a driver of the vehicle; and
a refrigerant passage switching means for switching a refrigerant flow among said compressor, said outer heat exchanger, said heat-radiating inner heat exchanger, said expansion valve and said heat-absorbing inner heat exchanger, said refrigerant passage switching means being set at one of a cooling mode, a first heating mode and a second heating mode according to signals from said inner thermal condition detecting means and said inner thermal condition setting means.

* * * * *